United States Patent [19]
Alberga et al.

[11] Patent Number: 5,934,186
[45] Date of Patent: *Aug. 10, 1999

[54] PACKAGING SYSTEM FOR DRY LASAGNA NOODLE PRODUCT

[75] Inventors: John Alberga, Sea Cliff, N.Y.; William Yeamen, Park Ridge, Ill.

[73] Assignee: Howden Food Equipment, Inc., Nashua, N.H.

[*] Notice: This patent issued on a continued prosecution application filed under 37 CFR 1.53(d), and is subject to the twenty year patent term provisions of 35 U.S.C. 154(a)(2).

[21] Appl. No.: 08/794,280

[22] Filed: Jan. 31, 1997

Related U.S. Application Data

[60] Provisional application No. 60/011,014, Feb. 1, 1996.

[51] Int. Cl.[6] .................................. A23L 1/00; A23C 3/00; A21C 9/08; A23P 1/00

[52] U.S. Cl. .................................. 99/489; 53/117; 53/520; 53/553; 83/53; 83/177; 83/407; 99/356; 99/472; 99/484; 99/537

[58] Field of Search .............................. 99/472, 484, 356, 99/485–491, 537, 538; 83/53, 51, 435.2, 177, 107, 371, 422, 879, 880, 407; 53/117, 520, 553, 516; 198/445, 465.3, 465.4; 426/637, 640, 520, 523, 241, 242, 629; 493/216, 248, 346, 347, 381, 921

[56] References Cited

U.S. PATENT DOCUMENTS

| | | | |
|---|---|---|---|
| 4,121,301 | 10/1978 | De Francisci | 99/353 |
| 4,147,081 | 4/1979 | Pellaton | 83/407 |
| 4,515,817 | 5/1985 | Pavan | 99/353 |
| 4,569,849 | 2/1986 | Codino | 426/275 |
| 4,592,698 | 6/1986 | Semp et al. | 83/53 |
| 4,604,947 | 8/1986 | Pavan | 99/407 |
| 4,711,165 | 12/1987 | Codino | 99/355 |
| 4,769,969 | 9/1988 | Minami | 53/117 |
| 4,769,975 | 9/1988 | Fava | 53/516 |
| 5,216,949 | 6/1993 | Bertozzi | 99/479 |
| 5,234,172 | 8/1993 | Chupka et al. | 83/53 |
| 5,425,959 | 6/1995 | Manser | 99/472 |
| 5,582,686 | 12/1996 | Chupka et al. | 83/53 |

*Primary Examiner*—Timothy F. Simone
*Attorney, Agent, or Firm*—Darby & Darby

[57] ABSTRACT

An automatic packaging system for dry lasagna noodle product includes a vacuum drum which automatically lifts a top layer of lasagna noodle from a bottom layer. The layers are travelling on a conveyor belt. The vacuum drum replaces the top layer back onto the conveyor belt behind the bottom layer. A water knife cutter is disposed downstream from the vacuum drum. The water knife cuts the lasagna in half. An inspection/rejection station is disposed downstream from the water knife cutter. The inspection/rejection station inspects piece of lasagna to ensure that it is of uniform shape and satisfies a predetermined minimum quality standard. A swing conveyor is disposed downstream from the inspection/rejection station. The swing conveyor transmits the lasagna onto one of two travelling conveyors. The travelling conveyors transmits the lasagna onto a loading conveyor. The loading conveyors transmits the lasagna into a bucket in a bucket indexer station.

23 Claims, 24 Drawing Sheets

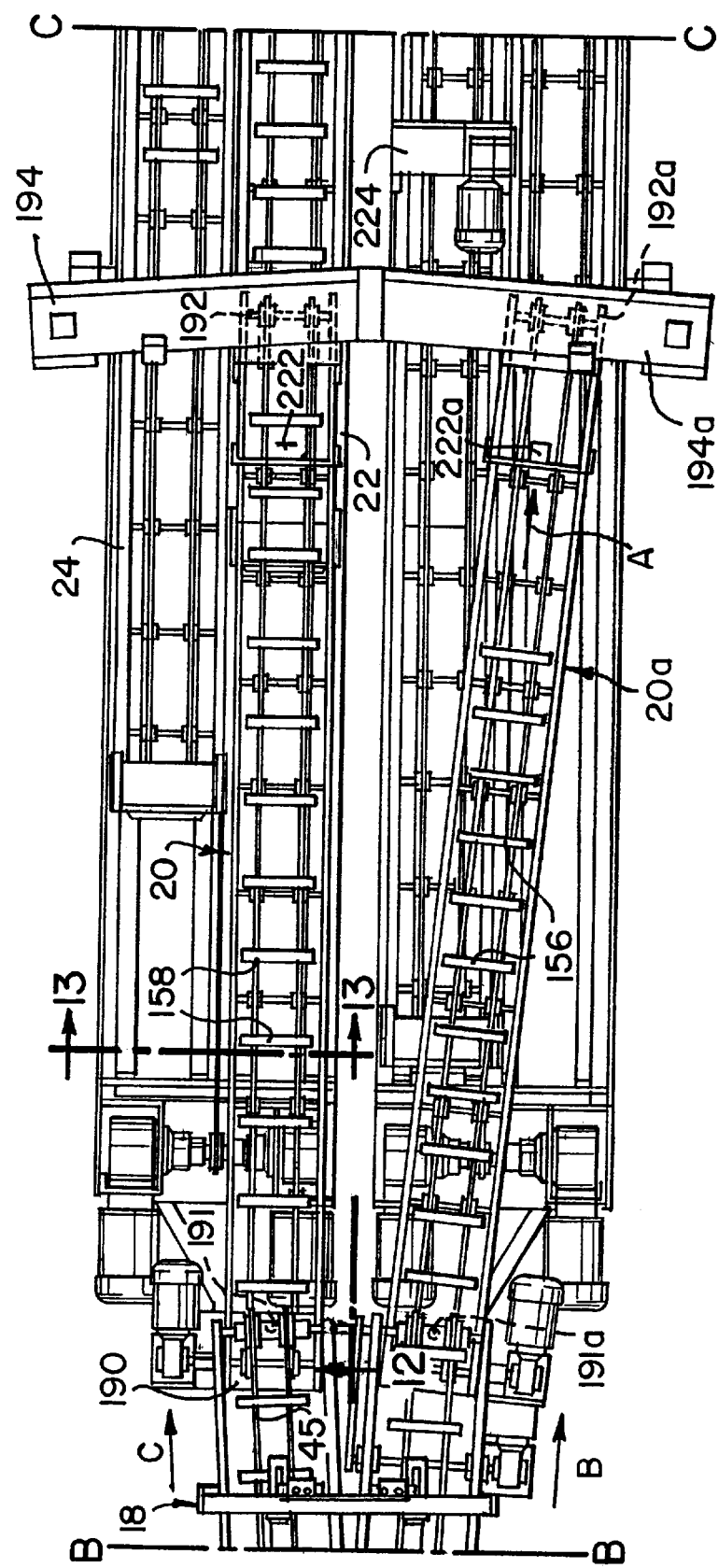

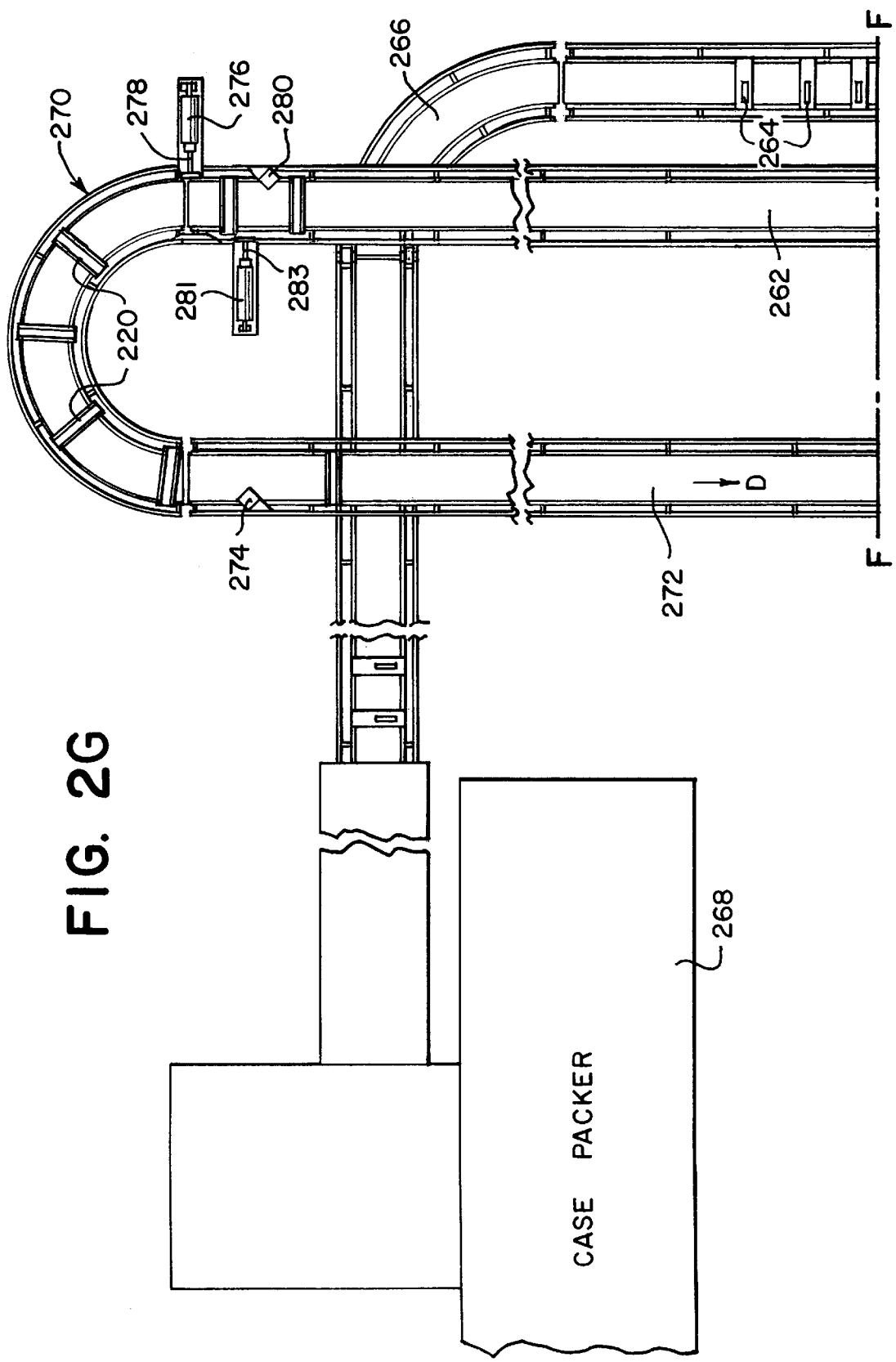

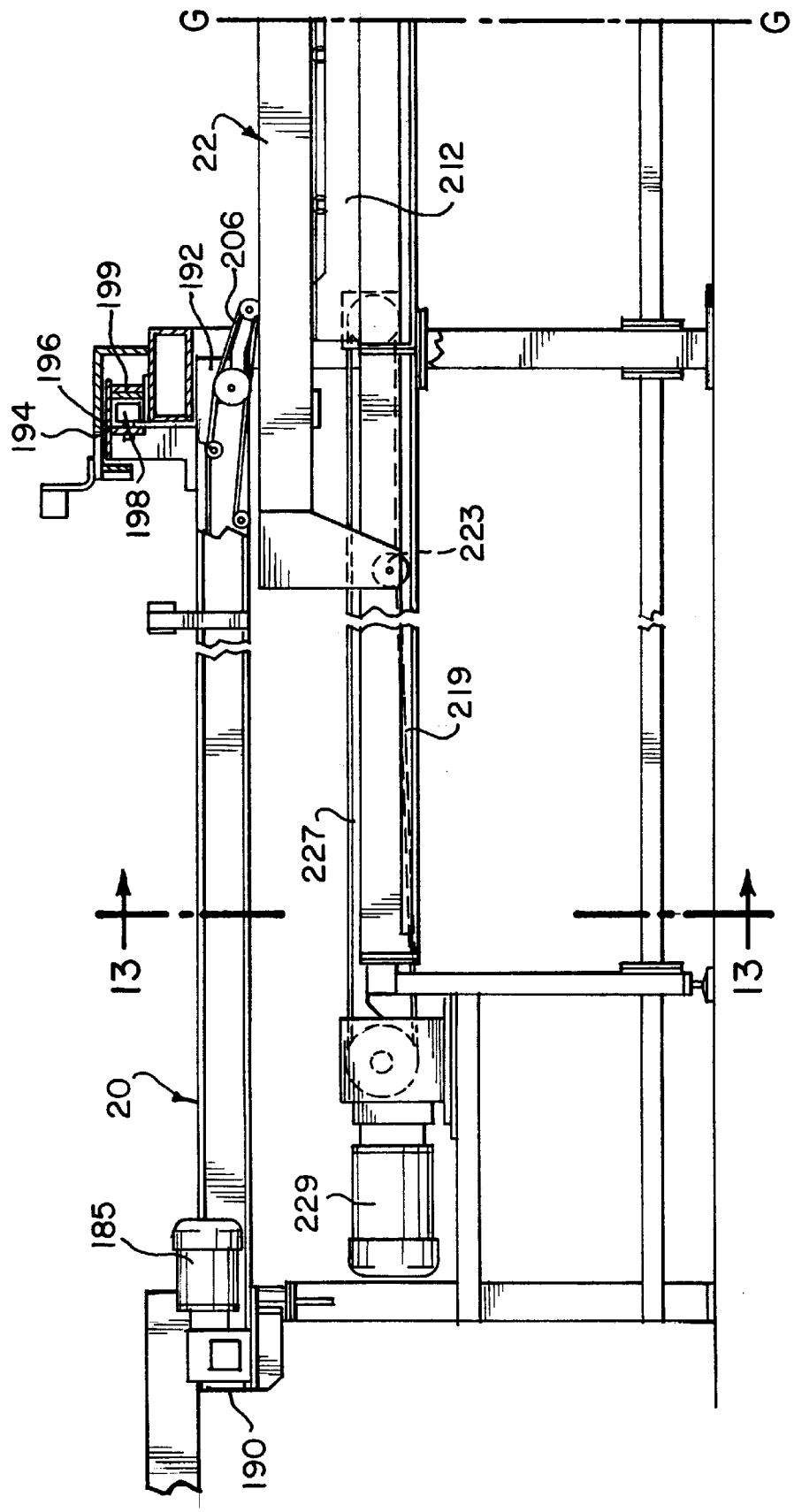

5,934,186

PACKAGING SYSTEM FOR DRY LASAGNA NOODLE PRODUCT

The enclosed application is based upon one Provisional Patent Application Ser. No. 60/011,014 filed Feb. 1, 1996. Applicants claim the benefit of the filing dates of the aforesaid provisional application under 35 U.S.C. §119(E)(1).

BACKGROUND OF THE PRESENT INVENTION

1. Field of the Invention

The present invention relates to an apparatus and method for collating and packing dry lasagna noodle product.

2. Discussion of the Related Art

Conventionally, dry lasagna product is packaged into cartons by having laborers place a predetermined number of lasagna pieces, which have been mechanically cut after being removed from a stripper. A predetermined weight of lasagna are placed within a bucket which is traveling along a closed loop assembly line. The filled buckets enter into a conventional cartoner which empties the lasagna from the filled buckets and places the lasagna into cartons. The empty buckets are redirected back to the assembly line to be refilled by the laborers. Such an assembly line is very labor intensive and typically requires at least 10–20 people per shift to operate.

Attempts have been made to automate the packaging of dry lasagna product. For example, U.S. Pat. No. 4,769,969 discloses a machine for packaging lasagna that includes a mechanical cutter 17 which includes three rotary wheel plates 18, which mechanically cut the double layer of lasagna. Additionally, U.S. Pat. No. 4,147,081 to Pellaton discloses a device for removing lasagna noodles from the pasta oven by splitting the pasta output from the oven along separate paths, after which the pasta noodles are cut with a mechanical saw 146 at saw station 36. These attempts to automate the processing of the dry lasagna product have proved to be cumbersome and inefficient in use. In other words, the prior attempts to automize the packaging of dry lasagna product have resulted in significant down time in the respective machinery.

Accordingly, it is an object of the present invention to provide an automated packaging system for dry lasagna product which requires fewer laborers to operate and which cartons and packages dry lasagna product at a greater production rate.

SUMMARY OF THE INVENTION

In accordance with a preferred embodiment demonstrating further objects, features and advantages of the present invention, a packaging system for dry lasagna product includes a vacuum drum that is configured to automatically lift the top layer of a lasagna noodle from the bottom layer of the noodle, and thereafter replace the top layer back onto the conveyor belt behind the bottom layer. In addition, a water knife cutter is used to provide a clean cut of the lasagna noodle which is significantly less likely to cause chipping of the dry lasagna product than a mechanical cutting instrument. In addition, an inspection/rejection station inspects each piece of lasagna to ensure that it is of uniform shape and satisfies a predetermined minimum quality standard. The lasagna noodle is then transferred to a swing conveyor which transmits the dry lasagna product onto one of two travelling conveyors. The travelling conveyors then transmits the dry lasagna product onto a loading conveyor, which transmits the dry lasagna product into empty buckets in a bucket indexer station. The filled buckets leave the bucket indexer station and progress over a check weigher scale before entering into a cartoner. The check weigher determines the weight of each individual filled bucket to ensure that the filled cartons will have a predetermined minimum weight while simultaneously ensuring that the cartons are not overpacked. The check weigher sends a signal back to the cutter so that the length of each piece of lasagna can be adjusted to be either longer or shorter to adjust the weight of each carton of lasagna accordingly.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 2 shows the layout of FIGS. 2A–2G, which FIGS. 2A–2G show the top plan view of the assembly, if they were to be laid out on a flat surface;

FIG. 2A is a top plan view of the stripper and vacuum drum according to the present invention;

FIG. 2B is a top plan view of the cutter station according to the present invention;

FIGS. 2C and 2D are top plan views of the swing conveyor and travelling conveyor according to the present invention;

FIG. 2E is a top plan view of the conveyor belt paths of the empty buckets leading to the bucket indexer and of the filled cartons leading to packer;

FIG. 2F is a top plan view of the conveyor belt leading from the bucket indexer carrying filled buckets to the cartoner;

FIG. 2G is a top plan view of the conveyor belts transferring filled cartons to the case packer and empty buckets to the bucker indexer;

FIGS. 12A and 12B are sectional views taken along lines 12—12 of FIGS. 2C and 2D and looking in the direction of the arrows;

DETAILED DESCRIPTION OF THE PREFERRED EMBODIMENTS

Figure 1:
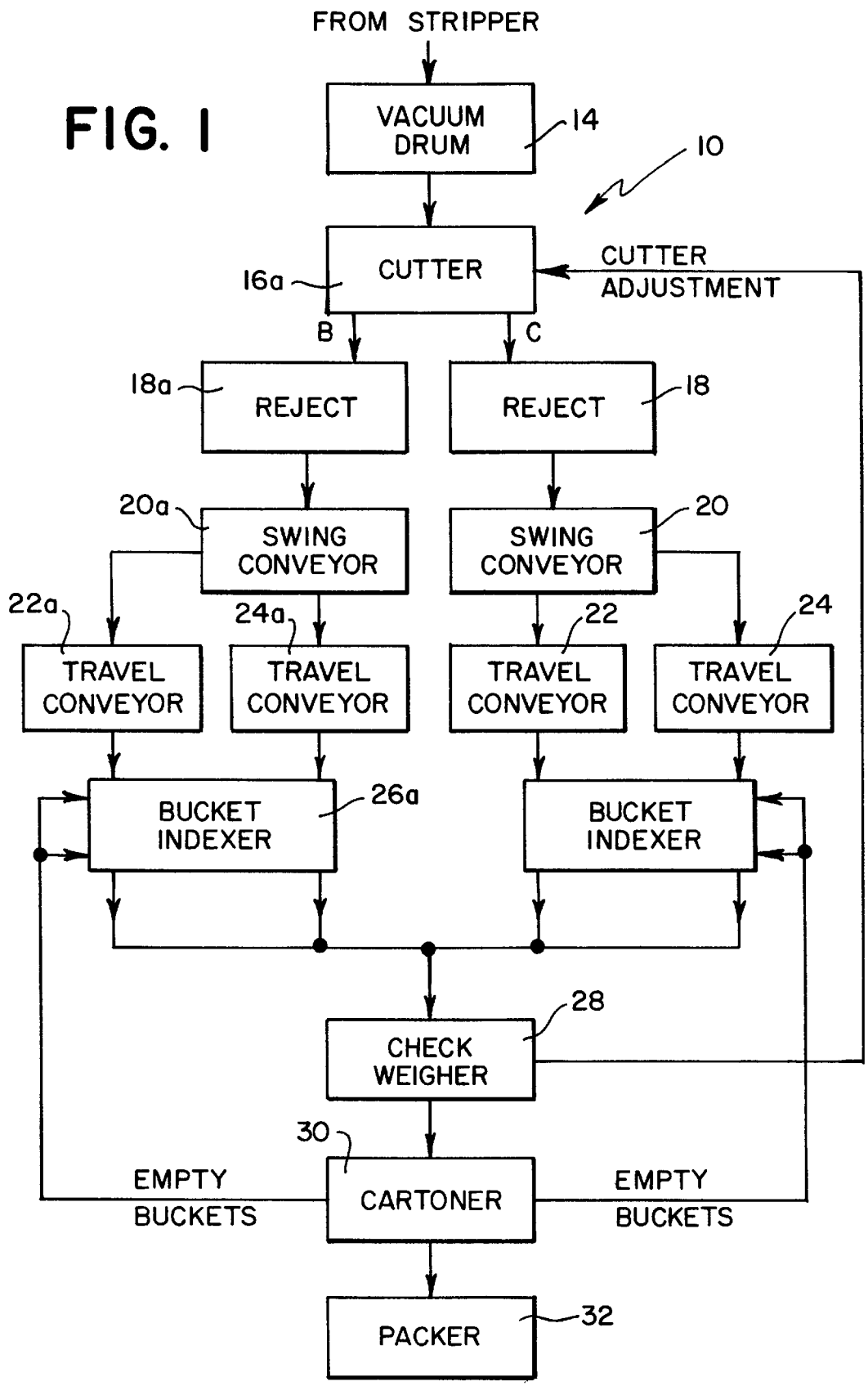
FIG. 1 illustrates a flowchart showing the procedural steps of the lasagna packaging machine according to the present invention.

Referring now to the drawing Figures, a lasagna packaging machine 10 is illustrated. Referring to FIG. 1, a flow chart illustrating the procedural steps of the lasagna packaging machine 10 is illustrated. For convenience purposes, reference to a piece of lasagna noodle will hereinafter be referred to simply as "lasagna" or "pieces of lasagna", etc., regardless of the egg content in the product. The dry lasagna is first removed from a conventional stripper and is placed on a conveyor belt. The lasagna is in a conventional double layer configuration where the upper and lower layer are integrally connected to each other and the dry lasagna product has a U-shape. The dry lasagna product has this shape because the lasagna is placed over a dowel to dry in the stripper. The dry lasagna is removed from the dowel by the stripper and is placed on a conveyor belt 34. The U-shaped end of the double layer of lasagna is cut in a conventional manner by a mechanical saw (not shown) as is known in the art.

The upper piece and lower piece of the lasagna are now approximately 20" long and each piece has a width of approximately 2⅜". The double layer of lasagna is transmitted, by belt 34, to a vacuum drum 14, where the top layer of lasagna is lifted off from the bottom layer. The top layer adheres to the outer circumferential surface of drum 14 and rotates once about drum 14 and is placed back on the conveyor belt 34 in an open space disposed behind the advancing bottom layer. The single layer of lasagna is transmitted from the vacuum drum 14 to a cutter 16 where each strip of lasagna is cut in half into two approximately 10" long pieces. The lasagna then travels to a vision inspection/rejection station 18. The inspection/rejection station 18 conducts a visual inspection of each piece of lasagna to ensure that it is a complete piece of approximately rectangular dimension. (i.e., the piece has no missing portions). If a piece of lasagna is determined to be below a predetermined minimum quality, that piece is removed from the conveyor belt 34 at the inspection/rejection station 18.

After passing the rejection station 18, the lasagna is then transmitted to a pair of swing conveyors 20, 20a. Each of the swing conveyors 20, 20a place the lasagna on either a first travelling conveyor 22, 22a or a second travelling conveyor 24, 24a. The lasagna that has been placed upon one of the aforesaid travelling conveyors is then transmitted to a loading conveyor, which transmits the lasagna into a bucket in the bucket indexer 26, 26a. A predetermined number of pieces of lasagna are placed within each bucket at the bucket indexer 26, 26a.

After a bucket has been filled with the predetermined number of pieces of lasagna, the filled buckets are then combined into a single conveyor belt. The filled buckets on the single conveyor belt then pass over a check weigher 28. Check weigher 28 determines the weight of each bucket to ensure that the minimum weight for each carton of lasagna is achieved while simultaneously ensuring that the cartons are not overpacked. The check weigher 28 sends a signal back to the cutter 16 to adjust the position of the cutting elements if the cartons are either underweight or overweight. Each piece of lasagna can be cut by cutter 16 so that it is either longer or shorter, within predetermined limits, to adjust the weight of each carton of lasagna accordingly. In other words, if the cartons of lasagna are too heavy, the lengths of the lasagna are cut smaller at the cutter station 16. Similarly, if the cartons are too light, the cutter is adjusted so that the lengths of each piece of lasagna are longer.

The filled buckets are then transferred to the cartoner station 30. The cartoner station 30 is of conventional structure and transmits the lasagna from the filled buckets to an empty carton. The filled cartons are then transferred to a conventional packer station 32. The emptied buckets leave the cartoner and are thereafter transferred back to the bucket indexer 26, 26a.

Figure 2:
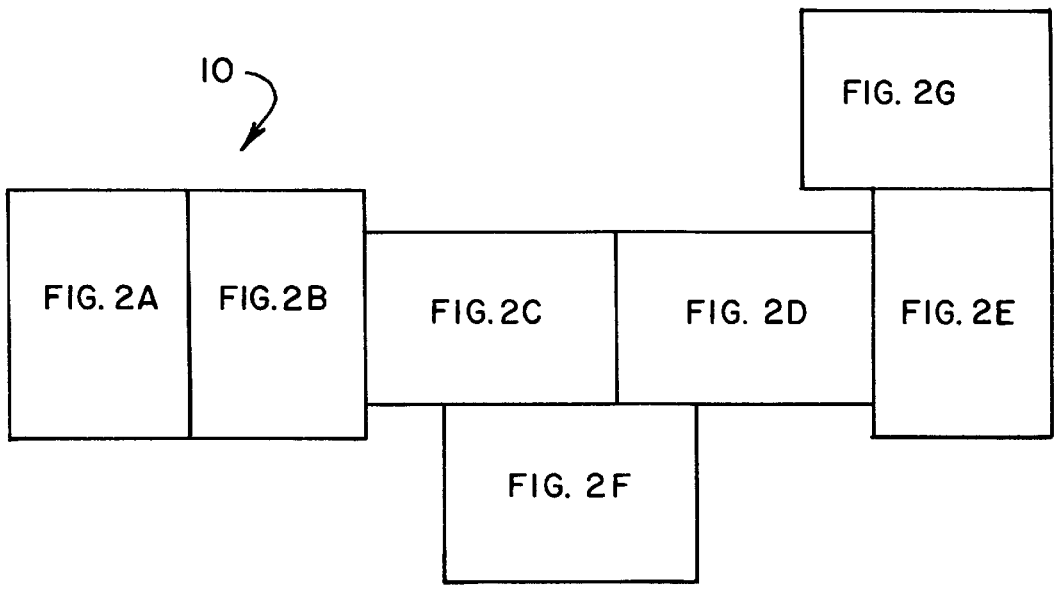

Referring now to FIGS. 2–2G, a top plan view of the entire assembly is illustrated. For the sake of clarity in the drawing Figures, FIG. 2 illustrates the layout for FIGS. 2A–2G, if these Figures were to be laid out and connected to one another. In other words, line A—A of FIG. 2A would be matched with line A—A of FIG. 2B. Similarly, line B—B of FIG. 2B would be matched with line B—B of FIG. 2C and so on.

Figure 2B:
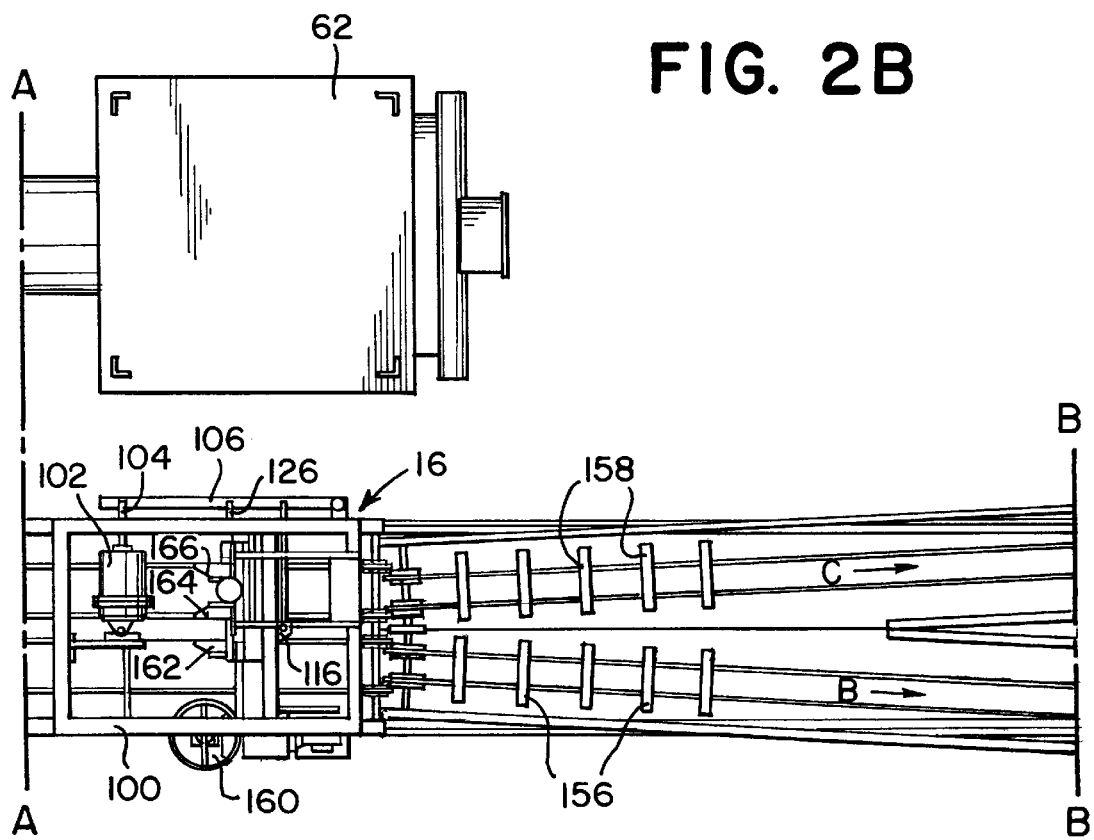
Figure 2A:
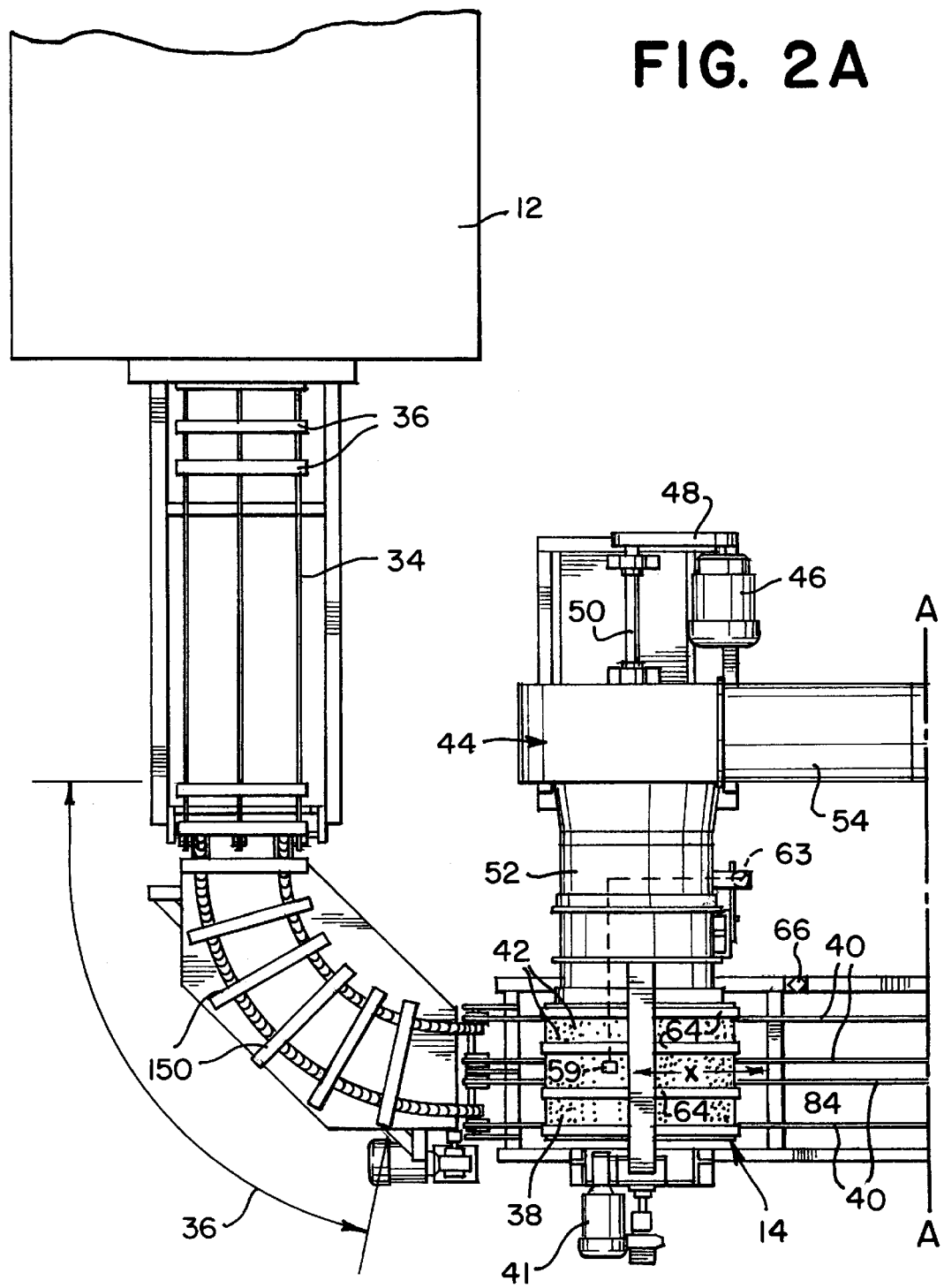

Referring now to FIG. 2A, the lasagna is dispensed from a stripper 12 of conventional construction, such that the lasagna, which has been hanging from a dowel, is placed upon the conveyor belt 34 and the dowel is thereafter removed. The width of the lasagna placed upon the conveyor belt 34 from one dowel or strip is approximately 92" wide. The strip of lasagna is illustrated as reference numeral 36 in FIG. 2A. The stripper 12 releases and drops a strip of double layer lasagna onto conveyor belt 34 approximately every 10 seconds. There is a gap disposed between each batch of lasagna strip 36 of at least 92" and more preferably about 116". The strip of lasagna 36 is then transferred about a 90° bend and is transmitted to the vacuum drum station 14.

Figure 3:
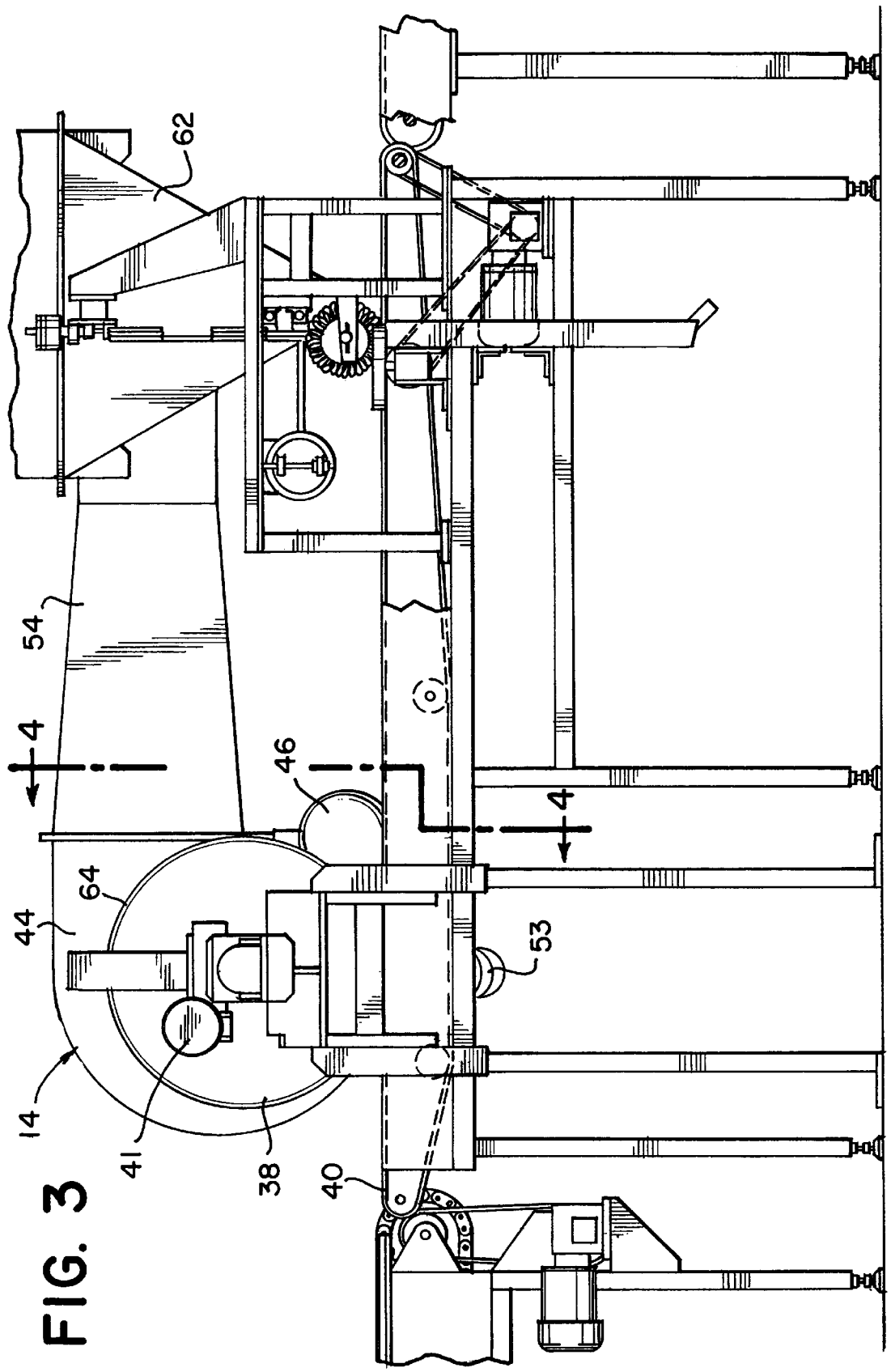
FIG. 3 is a right side view of the vacuum drum and cutting assembly according to the present invention.
Figure 4:
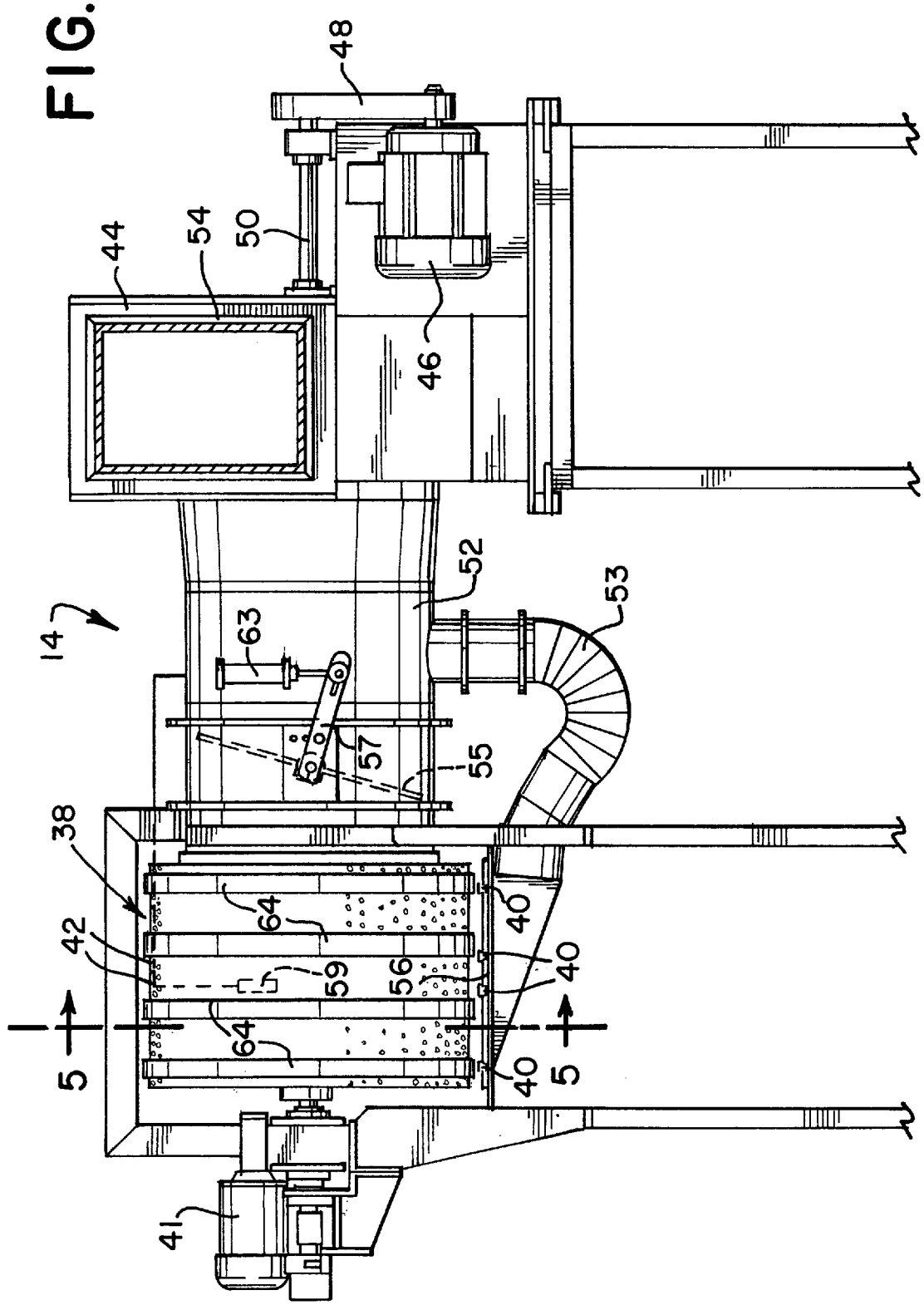
FIG. 4 is a sectional view taken along lines 4—4 of FIG. 3 and looking in direction of the arrows.

The vacuum drum station 14 is illustrated in FIGS. 2A, 2B and 3–6. Vacuum drum station 14 includes a rotating vacuum drum 38 disposed above conveyor belts 40 which carry the pieces of lasagna that have been transferred about the 90° bend. A motor 41 rotatably drives drum 38 about its axis. The outer periphery of drum 38 is perforated with a plurality of throughholes 42 as indicated in FIGS. 2A, 4 and 5. A vacuum pump 44 is fixedly mounted adjacent to the rotating vacuum drum 38. An electric motor 46 actuates vacuum pump 44 via a belt 48 which rotates shaft 50. Vacuum pump 44 includes an outlet conduit 54 and an inlet conduit 52. Inlet conduit 52 fluidly communicates with the interior chamber of vacuum drum 38. Additionally, conduit 52 fluidly communicates with a branch conduit 53. Conduit 53 is connected to a platform 56 disposed immediately below belts 40. A top surface 58 of platform 56 includes a plurality of grooves 60 to receive belts 40. Top surface 58 also includes a plurality of perforations 61, which transmit a vacuum force to be applied to the lower layer of lasagna. Belts 40 are disposed between the top 58 of platform 56 and the bottom most portion of rotating drum 38. As illustrated in FIGS. 2B and 3, the outlet conduit 54 is connected to a filter 62 so that the pumped air is cleaned before being discharged into the atmosphere. A butterfly valve 55 is disposed within conduit 52 as illustrated in FIG. 4. Valve 55 can be manually adjusted by lever 57 disposed outside of conduit 52 or can be automatically adjusted. For example, as shown in FIG. 4, a vacuum sensor 59 can be disposed within drum 38 to detect the vacuum level therein. A piston-cylinder unit 63 can be used to adjust the position of butterfly valve 55, through lever 57, to maintain the vacuum at a substantially constant level. For example, as the rotating drum picks up an increasing number of pieces of the top layer of lasagna in strip 36, the vacuum level within the drum 38 would increase if the butterfly valve 55 were to remain in the same position. However, the automatic feedback control provided by sensor 59 and piston-cylinder 63 permit the vacuum level within drum 38 to remain substantially constant. Valve 55 adjusts the relative amount of vacuum force applied through drum 38 and platform 56.

Figure 5A:
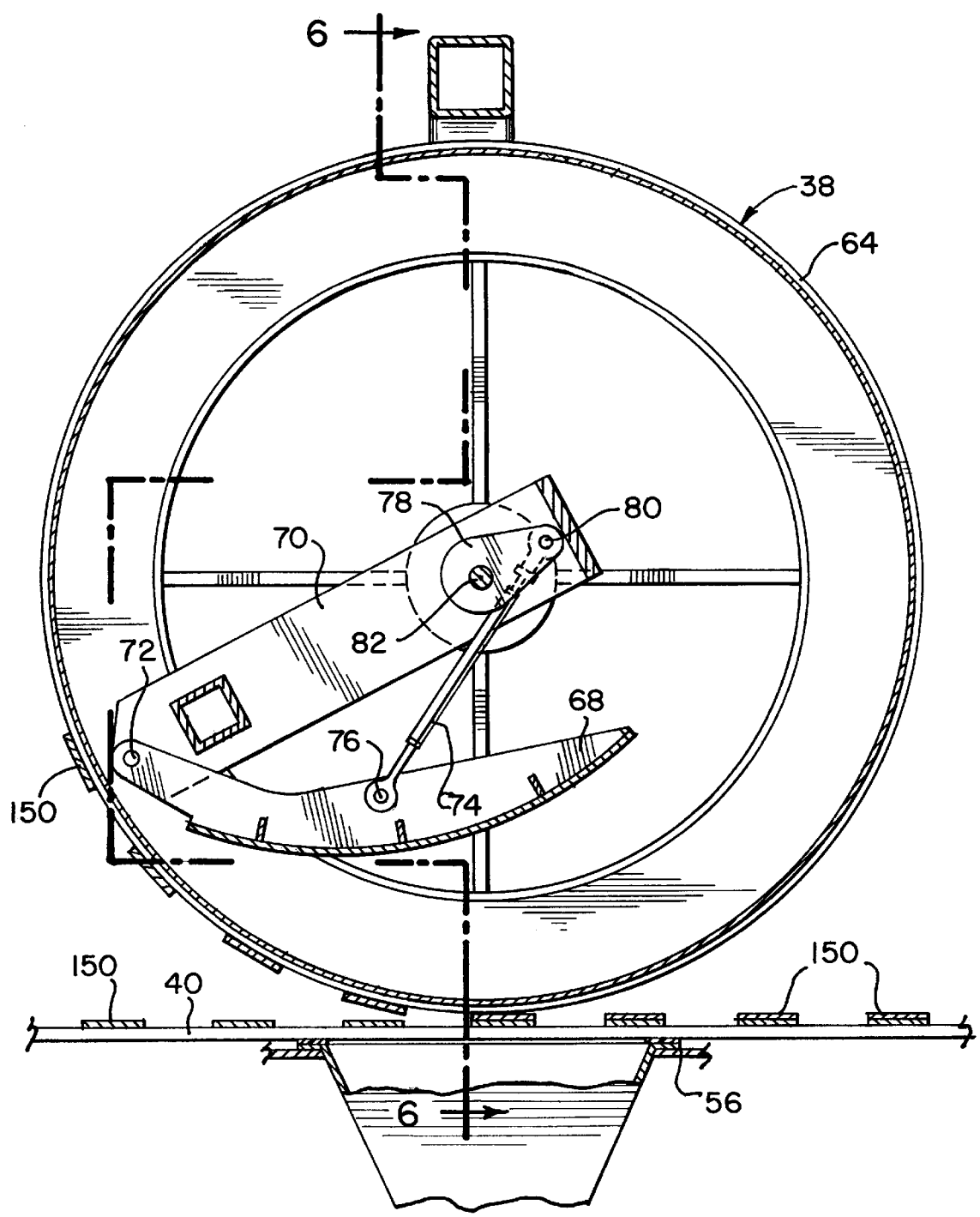
FIG. 5A is a sectional view taken along lines 5—5 of FIG. 4 and looking in the direction of the arrows, which shows the shoe in the vacuum permitting position.
Figure 5B:
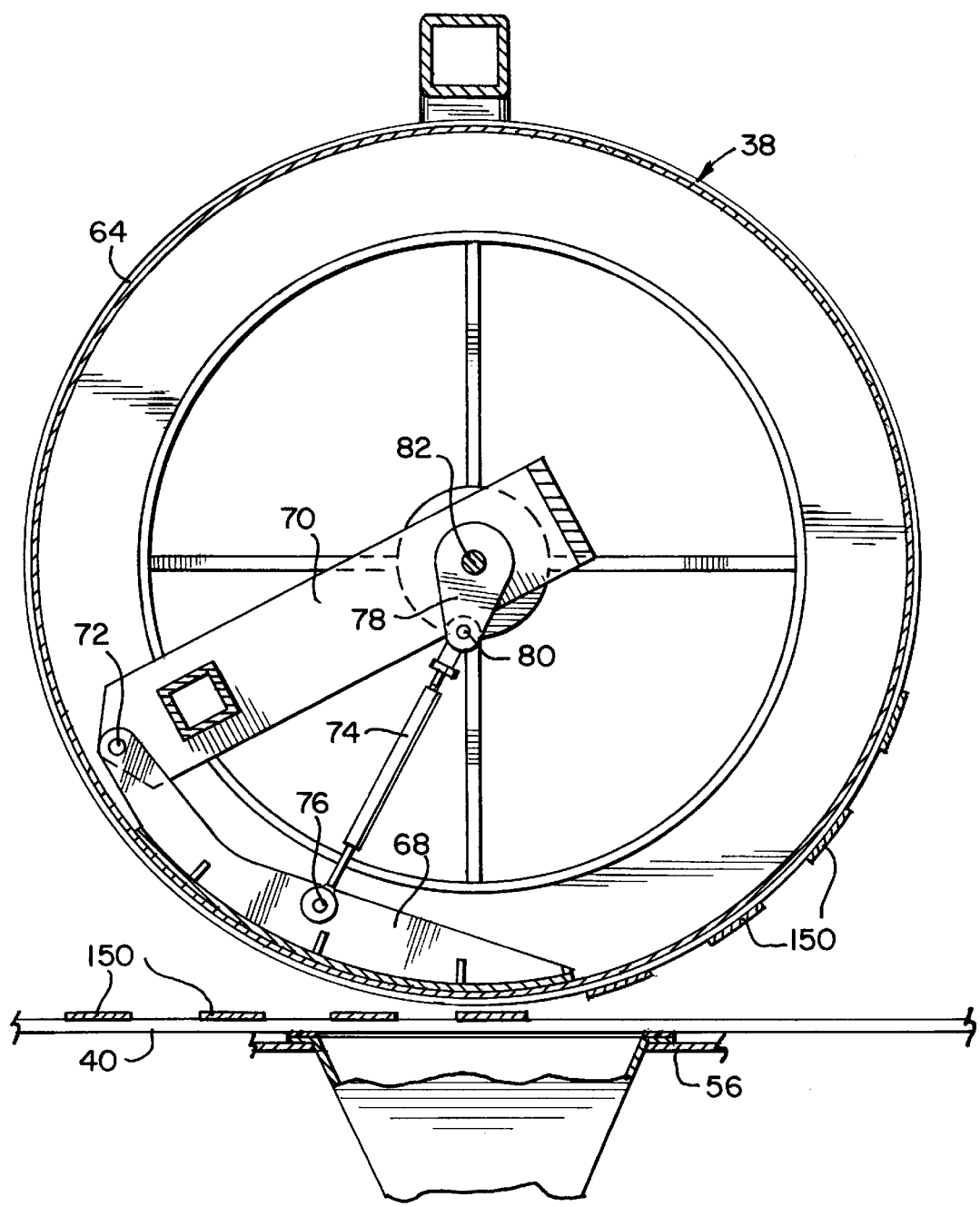
FIG. 5B is a sectional view taken along lines 5—5 of FIG. 4 and looking in the direction of the arrow, which shows the shoe in the vacuum blocking position.
Figure 6:
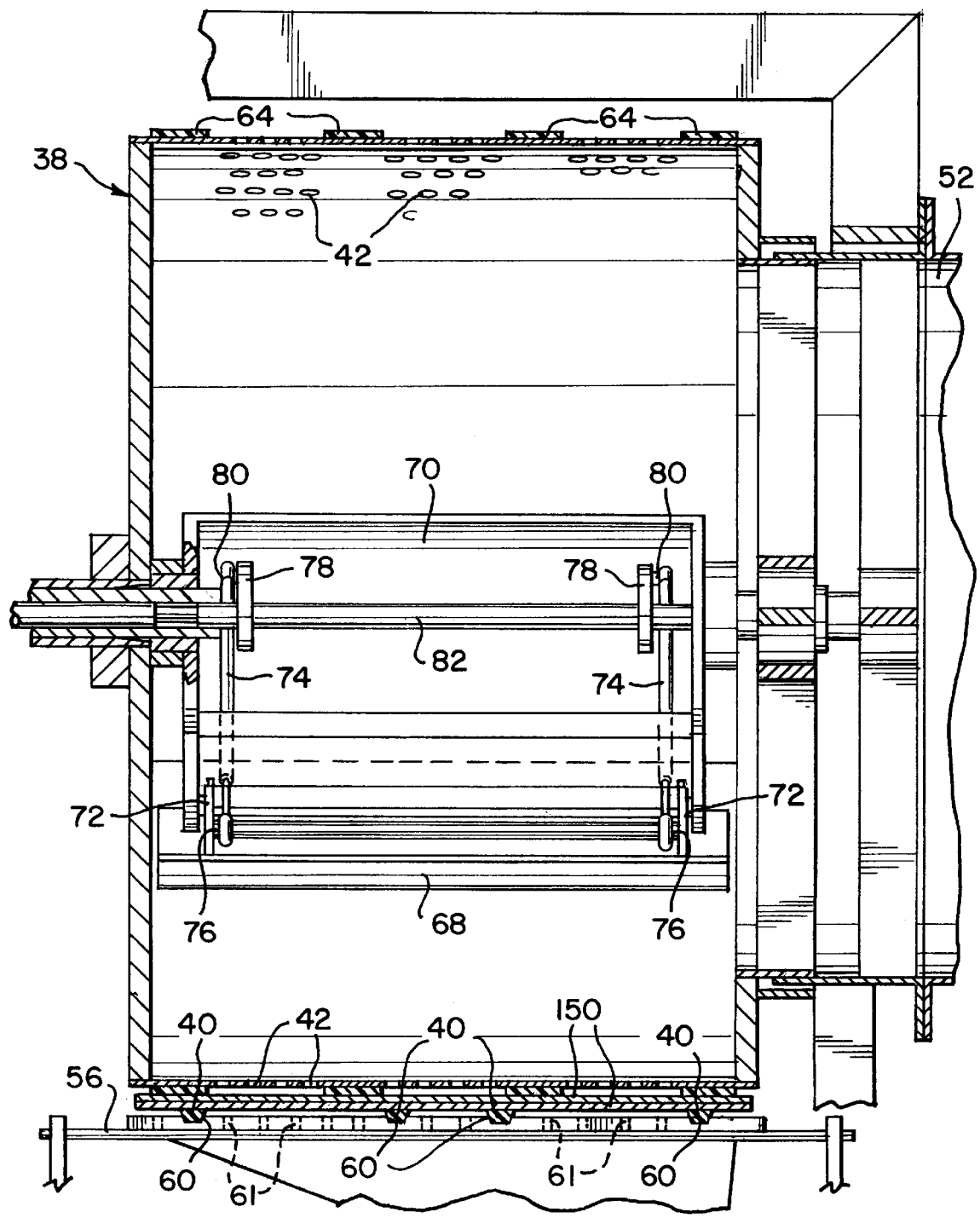
FIG. 6 is a sectional view taken along lines 6—6 of FIG. 5A and looking in the direction of the arrows.
Figure 7:
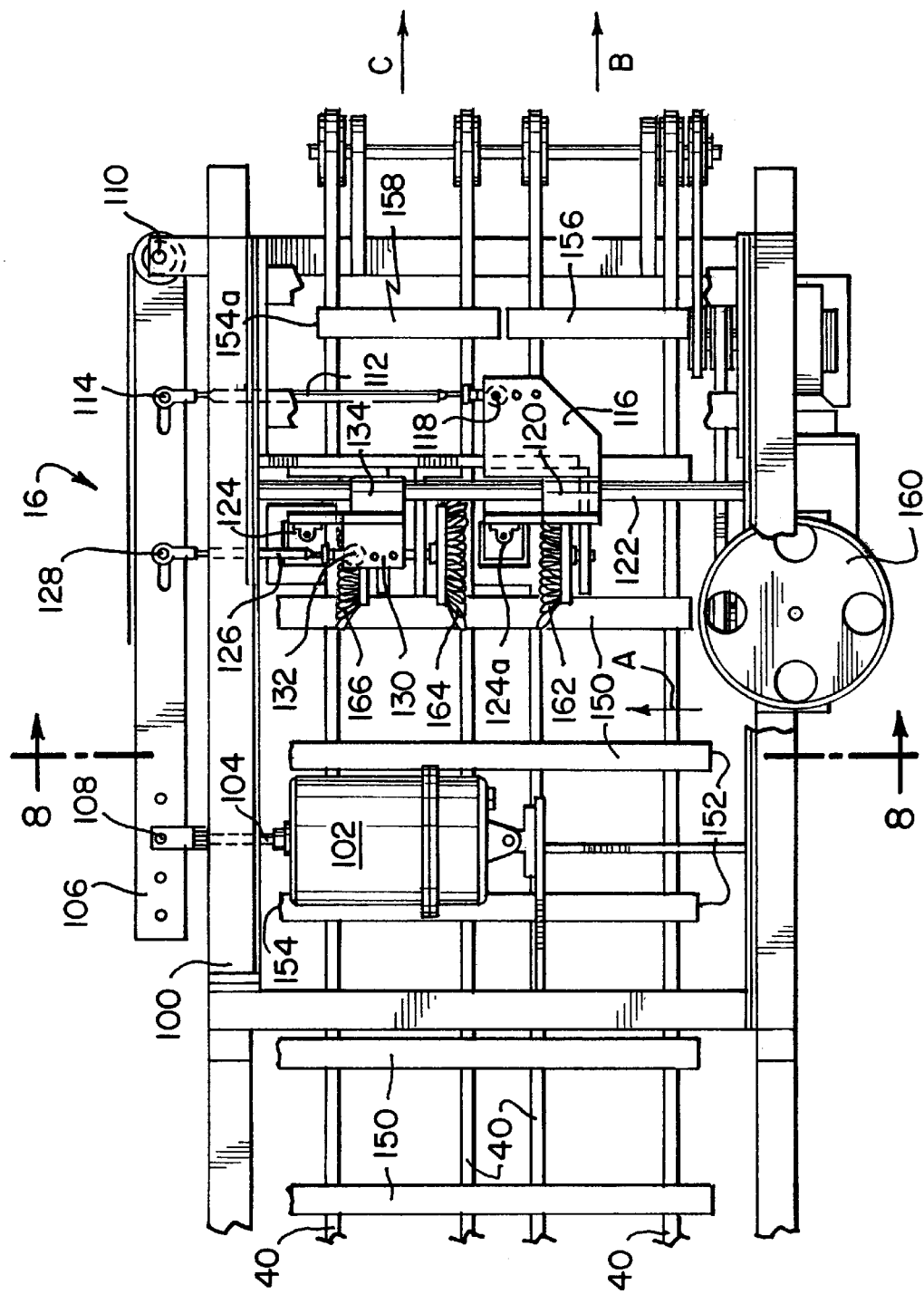
FIG. 7 is a top plan view of the cutting station according to the present invention.
Figure 8:
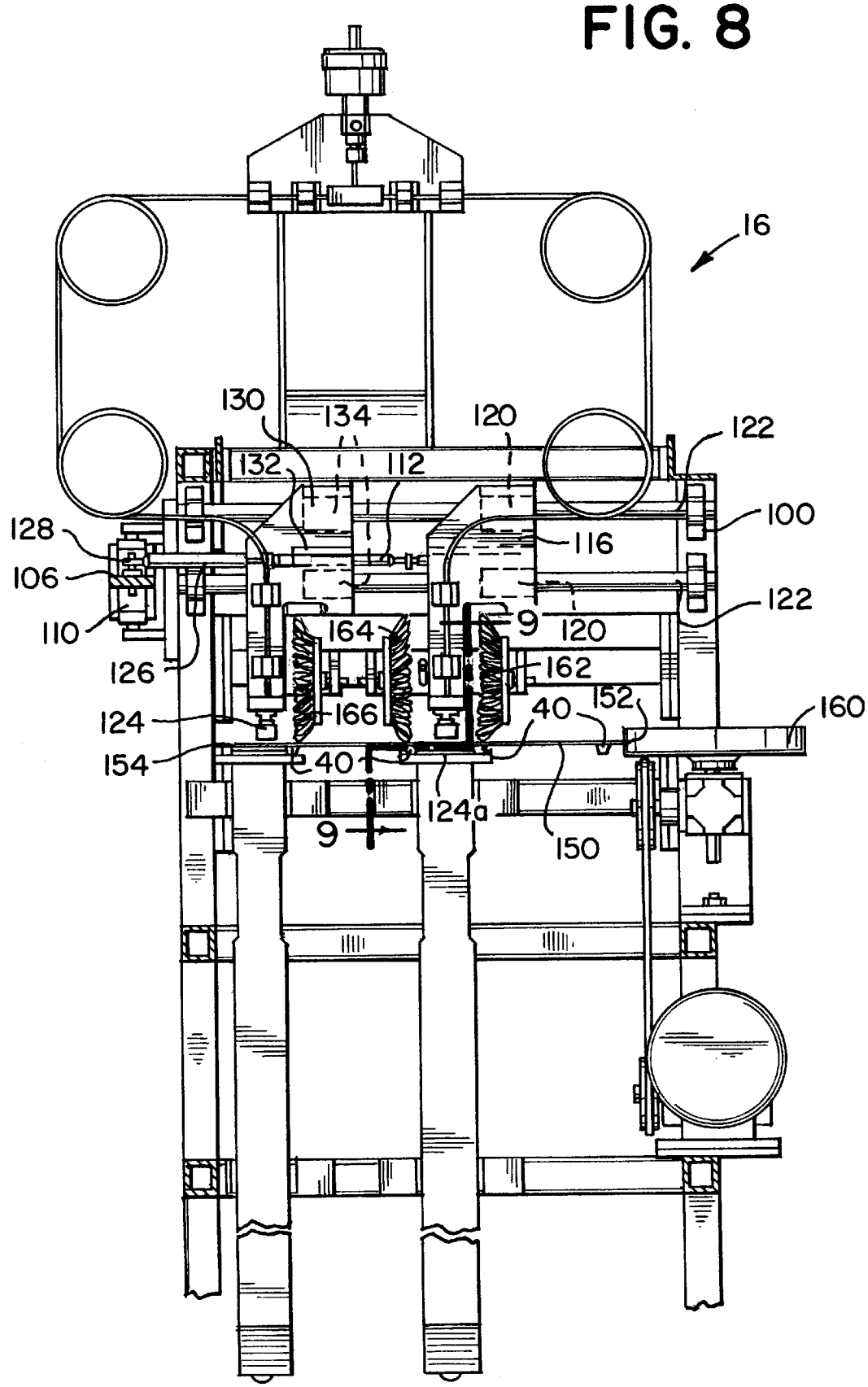
FIG. 8 is a sectional view taken along lines 8—8 of FIG. 7 and looking in the direction of the arrows.

As illustrated in FIG. 2A, the exterior surface of drum 38 includes four belts 64 of a plastic material. The belts 64 are preferably of a plastic neoprene material so that the dry lasagna noodles only contact belt 64 of rotating drum 38. The belt material reduces the likelihood of any relative movement between the drum 38 and the lasagna. A sensor 66 is disposed upstream of the rotating drum 38 and detects when the first piece of a strip of lasagna 36 has passed by a predetermined point 84 below sensor 66 (see FIG. 2A). All of the sensors used in the present invention are preferably retro reflective photo eyes and are commercially available from numerous sources, such as, for example, the Banner Co. That predetermined point 84 below sensor 66 is spaced at a predetermined distance X in front of the lower most point of drum 38. Disposed inside of rotating drum 38, is an arcuately shaped shoe 68. Shoe 68 is pivotally connected to a fixed bracket 70 about pivot point 72. Shoe 68 is rotated from the vacuum blocking position illustrated in FIG. 5B to the up or vacuum permitting position illustrated in FIG. 5A. Shoe 68 is pivotally connected to a pair of rods 74 about pivot points 76. Rods 74 are also pivotally connected to cams 78 about pivot points 80. Thus, cam 78 is selectively rotated about longitudinal shaft 82 thus causing shoe 68 to pivot between the vacuum permitting position (FIG. 5A) and the vacuum blocking position (FIG. 5B).

In a preferred embodiment, the circumference of drum 38 is approximately 96". If, for example, distance X is 10", then when sensor 66 detects the first piece of lasagna from the strip 36, the sensor 66 sends a signal to the control system (not shown) to indicate that the first piece of lasagna is at predetermined position 84. The shoe 68 is in the up or vacuum permitting position (FIG. 5A). The control system maintains the shoe 68 in this up position while the outer periphery of drum 38 rotates for the distance X plus the circumference of the rotating drum 38. Therefore, in the preferred embodiment, the drum 38 is permitted to rotate 106" before the shoe 68 is pivoted to the vacuum blocking position (FIG. 5B). As the double layer of lasagna is transmitted toward the rotating drum 38, the lower layer of lasagna is maintained on the conveyor belts 40 due to the suction force applied through the perforations 60 in the bottom platform 56. However, the suction or vacuum force applied through perforations 42 in rotating drum 38 is sufficient to lift the top layer of lasagna noodles off from the bottom layer. The top layer of lasagna then adheres to the outer circumference of rotating drum 38 (see FIG. 5A). The entire strip 36 of lasagna passes under rotating drum 38 and each top piece of lasagna is lifted off and placed about the outer periphery of rotating drum 38. Eventually, the entire upper layer of the strip of lasagna is disposed on the outer periphery of the rotating drum 38. The shoe 68 is then pivoted to the down or vacuum blocking position (FIG. 5B). The first piece of lasagna from the strip 36 continues to rotate about the central shaft 82 and passes over the portion of the drum adjacent to the shoe 68. Shoe 68 blocks the vacuum force applied by the drum 38 thus the pieces of lasagna which were adhered to the outer periphery of the rotating drum 38 begin to fall off the rotating drum 38 and land back on the conveyor belts 40 (see FIG. 5B). It should be noted that the lower layer of lasagna has now completely passed under the rotating drum 38. Therefore, there is a gap disposed between the last piece of lasagna from the bottom layer and the first piece of lasagna from the upper layer. In a preferred embodiment, this gap is approximately 4" long. The shoe 68 is held in the vacuum blocking position for one complete revolution of the rotating drum 38 to ensure that the entire upper layer of lasagna is then redeposited onto the conveyor belts 40. The shoe 68 is then lifted to the vacuum permitting position and waits for the next signal from the sensor 66 indicating that the first piece of double layer lasagna from the next strip is approaching. The above described process is then repeated.

Referring now to FIGS. 2B, 7, 8 and 9, cutting station 16 is illustrated. Cutting station 16 includes a motor 102 that is fixedly mounted to the supporting frame 100. Motor 102 actuates a reciprocating rod 104 which is pivotally connected to a lever arm 106 about pivot point 108. Lever arm 106 pivots about a pivot point 110. A first connecting arm 112 is pivotally connected to lever arm 106 about pivot point 114. Connecting arm 106 is pivotally connected to a mounting bracket 116 about pivot point 118. Bracket 116 includes a pair of cylindrical throughbores 120. A pair of fixed guide rods 122 extend through throughbores 120. Thus, mounting bracket 116 is only permitted to move along the axis of guide bar 122, which axis is substantially coextensive with the length of each piece of lasagna. A water jet cutting nozzle 124 is attached to bracket 116. The water emitted from nozzle 124 is at a pressure of 55,000 and has a thickness of about 4–6 thousandths of an inch. The high pressure water jet 124 cuts the lasagna in a straight uniform manner that is aesthetically pleasing to the consumer. If desired a shroud may be placed about the water spray and a vacuum line can be fluidly connected to the inside of the shroud to remove any mist that may occur during the cutting process.

A second connecting arm 126 is pivotally connected to lever arm 106 about pivot point 128. Pivot point 128 is preferably disposed twice as far from pivot point 110 as is pivot point 114. The opposite end of arm 126 is pivotally connected to a second mounting bracket 130 about pivot point 132. A second water jet nozzle 124a is mounted on bracket 130. Bracket 130 also includes a pair of throughbores 134 which are mounted about guide rods 122. Thus, bracket 130 is also constrained to move along the axis of guide rods 122. Water jet nozzle 124a moves twice the distance along the longitudinal axis than the distance that water jet nozzle 124 moves when lever arm 106 is pivoted about point 110.

Each piece of lasagna 150 is comprised of an uncut or good edge 152 and a rough cut edge 154. (See FIG. 7), The good edge 152 corresponds to the free end of each piece of lasagna as it comes off the strip from the stripper. The rough edge 154 corresponds to the U-folded edge which has been mechanically cut in a conventional matter to separate the top layer from the bottom layer. Thus, the water jet nozzle 124 cuts each piece of lasagna in half and water jet nozzle 124*a* cuts the end corresponding to the former U-shaped end to provide a straight uniform cut 154*a* on the former rough edge. Because any position adjustments of cutting nozzle 124*a* are made at twice the distance of the position adjustments of nozzle 124, each half piece of lasagna 156, 158 are of substantially the same size regardless of the amount of position adjustment that is made to each water nozzle 124, 124*a*. Before each piece of lasagna is cut by the water nozzles 124, 124*a*, the good edge 152 comes into contact with a rotating registration wheel 160. The outer periphery of wheel 160 rotates at about approximately the same speed as that of the conveyor belts 40 so that minimal or no relative motion occurs between the outer periphery of wheel 160, and each advancing piece of lasagna 150. As the piece of lasagna travels towards the registration wheel 160 it contacts the outer periphery of wheel 160. Wheel 160 then pushes each piece of lasagna in the direction indicated by arrow A so that the free edge 152 of each piece of lasagna 150 is in the same relative position with respect to the fixed frame 100, thereby ensuring that each piece of lasagna is cut at the same relative position.

Figure 9:
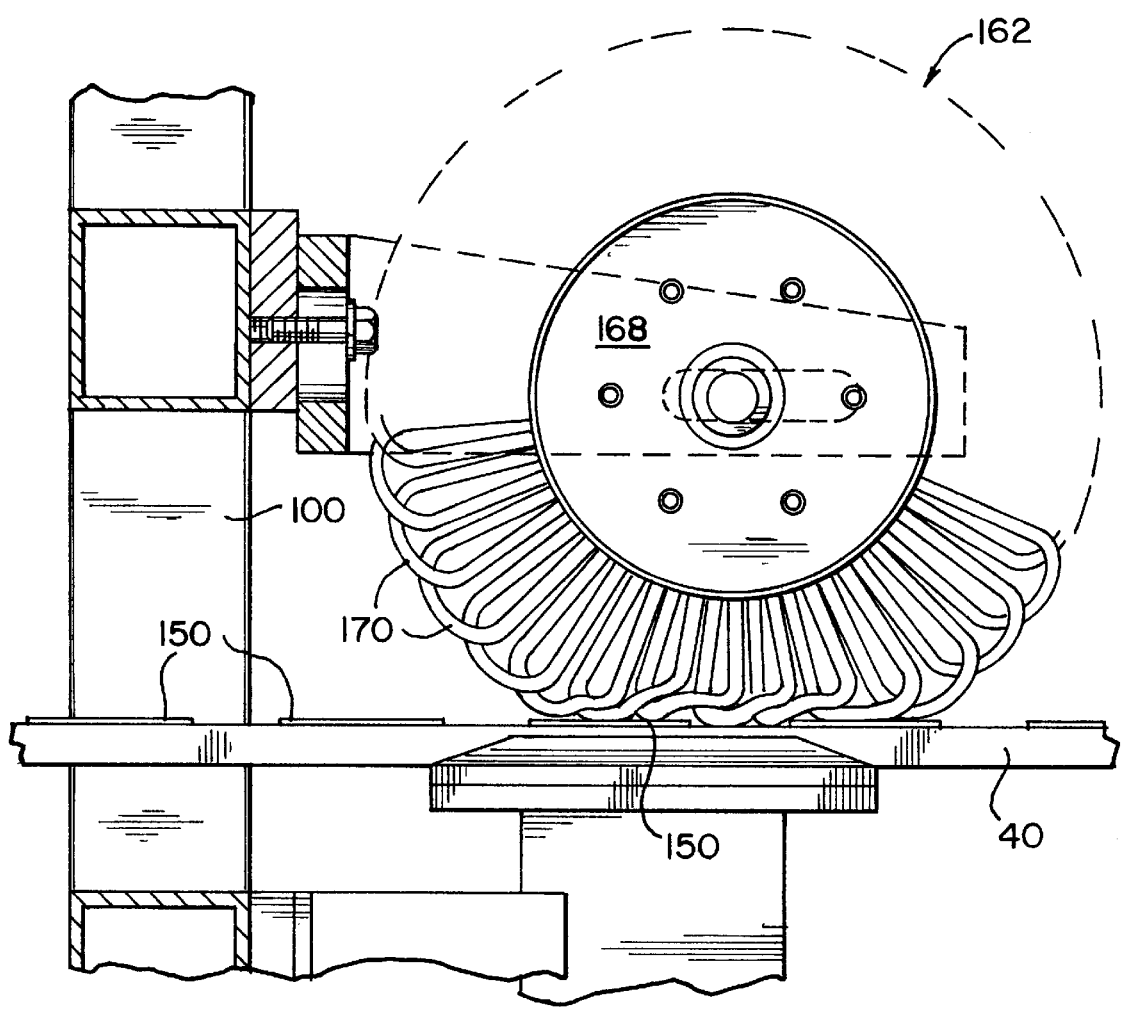
FIG. 9 is a sectional view taken along lines 9—9 of FIG. 8 and looking in the direction of the arrows.

The cutting station 16 also includes three rotating position maintenance wheels 162, 164, 166. Each wheel rotates such that the outer periphery of each wheel moves at substantially the same speed as belt 140 moves. Referring now to FIG. 9, wheel 162 is shown in greater detail. Wheel 162 includes a center rotating hub 168. A plurality of elastic neoprene loops 170 are attached to rotating hub 168. The loop or U-shaped end of each loop 170 comes into contact with the upper surface of each piece of lasagna 150 so that each piece of lasagna is firmly held in position against the travelling belts 40. The U-shaped ends of the loops 170 elastically deform so that the lasagna pieces 150 are not broken. Position maintenance wheels 162, 164 are positioned about water jet nozzle 124 and wheel 166 is positioned on the side of water jet nozzle 124*a* that is disposed opposite to the rough end 154 or U-folded end of each piece of lasagna 150. The piece of lasagna that is disposed on the side of nozzle 124*a* opposite that of rotating position maintenance wheel 166 will be scrap material after it has been cut by the water jet nozzle 124*a*. Thus, no position maintenance device is required on the rough end side of nozzle 124*a*. As shown in FIG. 2B and as schematically shown in FIG. 1, after the pieces of lasagna 156, 158 leave the cutting station 16, the paths are divided to carry the piece of lasagna 158 along path C and pieces 156 along path B.

Figure 10:
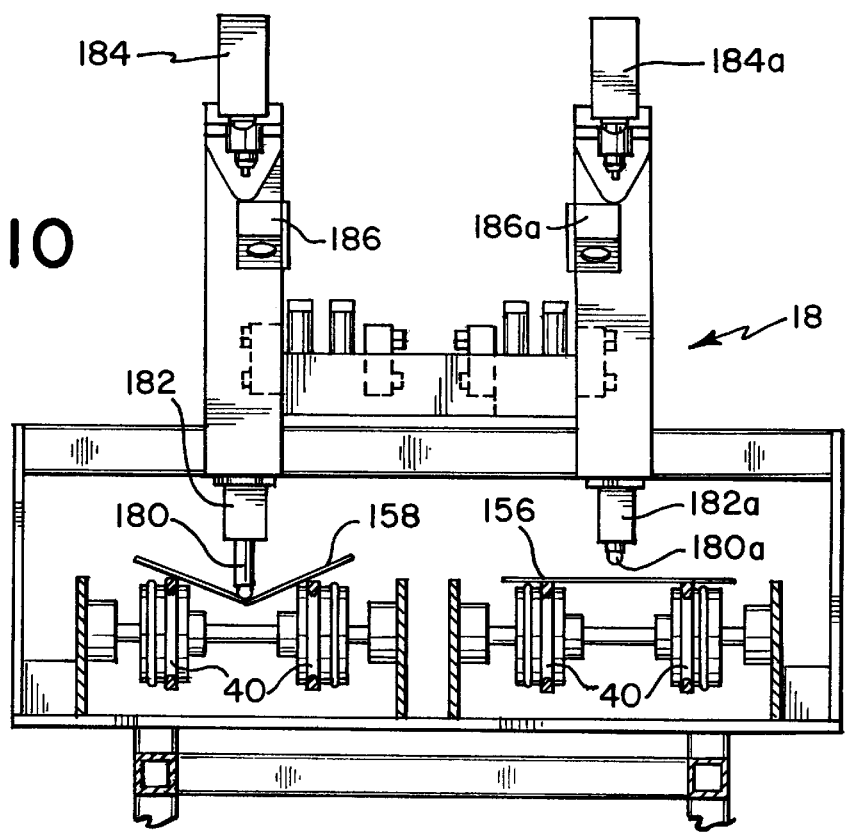
FIG. 10 is a front view of the inspection/rejection station according to the present invention.
Figure 11:
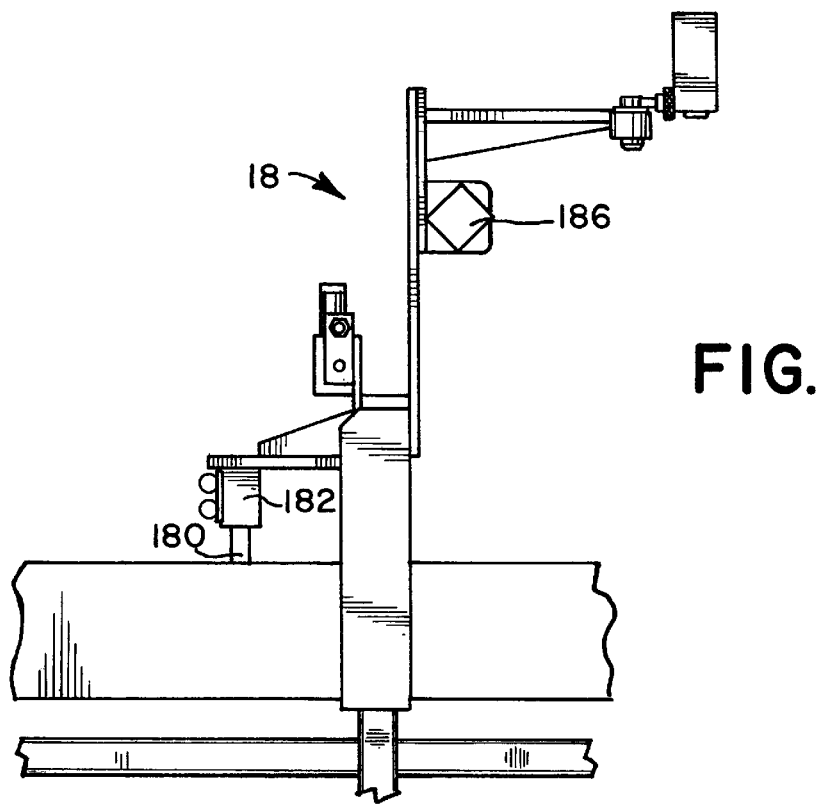
FIG. 11 is a left side view of the inspection/rejection station according to the present invention.

Referring now to FIGS. 2C and FIGS. 10 and 11, an inspection and rejection station 18*a* is illustrated. Each path B,C includes a video camera 184 which inspects each piece of lasagna and determines if that piece is of a predetermined minimum quality. Such a video camera, per sé, is of conventional structure and can be purchased from Allen Bradley of Cincinnatti, Ohio. In other words, each piece of lasagna must be of a substantially rectangular configuration with no major defects. It is to be noted that defects may include chips or cracks which can be detected by the video camera 184. If such a defective piece of lasagna were included in a carton of lasagna, that piece may cause the carton to be underweight. A sensor 186 is also positioned adjacent to and downstream from camera 184 to detect when the defective piece of lasagna has arrived at a predetermined position in the inspection and rejection station 18, 18*a*. When the camera 184 detects that a certain piece of lasagna is below minimum standards, it sends an appropriate signal to the control system, which causes a rejection station 18, 18*a* to actuate when the advancing defective piece of lasagna is disposed below a pin 180 in one of the rejection stations 18, 18*a*. Each rejection station 18, 18*a* includes a reciprocating pin 180 which is actuated to the down position by a solenoid 182 at the precise moment that the rejected piece of lasagna is disposed below pin 180. Pin 180 extends to the position illustrated to the left in FIG. 10 causing the rejected piece of lasagna to break and fall from the conveyor belts 40 to a scrap bin below (not shown). Pin 180 quickly retracts, to the position illustrated to the right in FIG. 10, so that the next piece of lasagna can freely pass by if it is of sufficient quality. Of course, other methods of removing the defective piece of lasagna from the belt 40 can be utilized, such as, for example, a jet of air to lift the piece of lasagna from the conveyor belts. If the video camera 184, which inspects each piece of lasagna, determines that a piece of lasagna is of satisfactory quality, then that piece of lasagna is allowed to pass by rejection station 18, 18*a*. The pieces of lasagna are then transferred onto a swing conveyor 20, 20*a*, respectively.

Figure 12B:
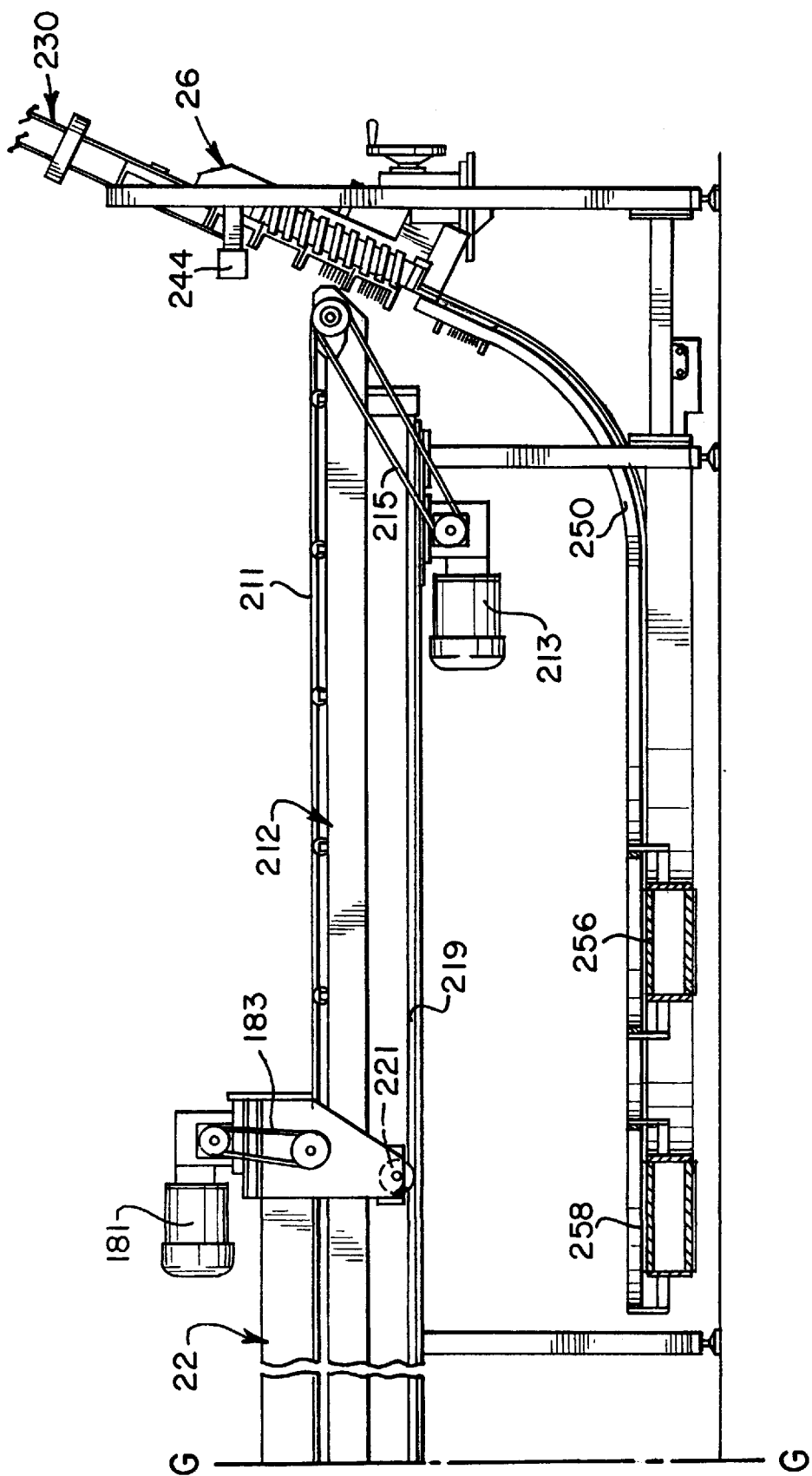
Figure 13:
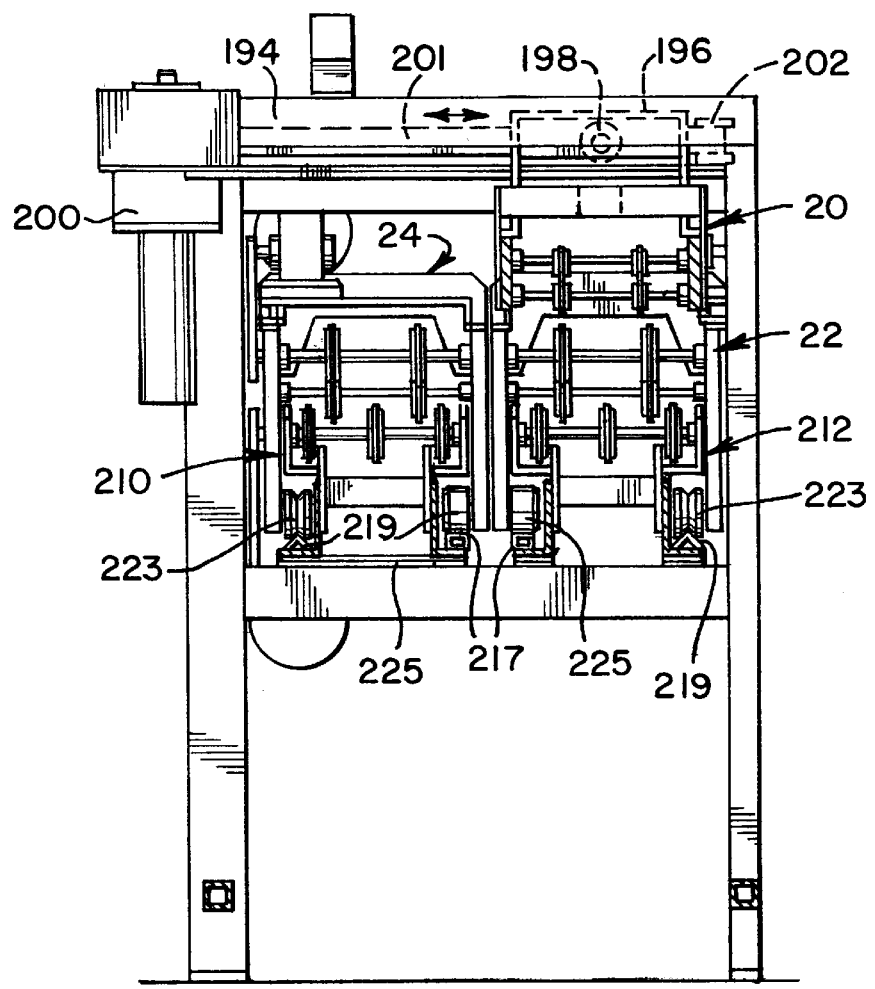
FIG. 13 is a sectional view taken along lines 13—13 of FIG. 12A and 2C and looking in the direction of the arrows.

Referring now to FIGS. 2C, 2D, 12A, 12B, 13 and 14 the swing conveyors 20, 20*a* and the travelling conveyors 22, 22*a* and 24, 24*a* are illustrated. The lasagna is transferred from the inspection and rejection stations 18, 18*a* to the swing conveyor 20, 20*a*, respectively. Each of the swing conveyors 20, 20*a* is disposed above the travelling conveyors 22, 22*a*, 24, 24*a*. Swing conveyor 20 has a first end 190 disposed adjacent to the inspection and rejection station 18 and a second end 192 disposed within a fixed guide housing 194. Swing conveyor 20 pivots about its first axial end 190 on shaft 191. A U-shaped bracket 196 has a guide roller 198 rotatably mounted thereto. Bracket 196 is mounted on the second end 192 of the swing conveyor 20. The mounting bracket 196 of the roller 198 is fixedly attached to a belt 201 which moves the swing conveyor 20 between a first position disposed over travelling conveyor 22 (as illustrated in FIG. 13) and a second limit position disposed over travelling conveyor 24. Belt 201 is driven by an electric motor 200 and rotates about roller 202 to cause the swing conveyor 20 to move back and forth between the first limit position and the second limit position. The second swing conveyor 20*a* is similarly mounted within a fixed housing bracket 194*a*. Each housing 194, 194*a* has a sensor 201, 201*a* mounted on the second end. Sensor 201 detects when the swing conveyor 20 is in the second limit position and sensor 201*a* detects when swing conveyor 20*a* is in the second limit position.

Figure 14:
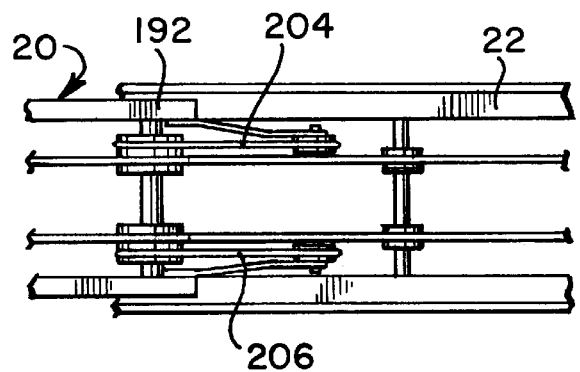
FIG. 14 is a top plan view of the transition disposed at the end of the swing conveyor and leading to the beginning of the travelling conveyor.

The transition at the end of the swing conveyor 20 and the beginning of the travelling conveyor 22 is illustrated in FIGS. 12A and 14. The second end 192 of the swing conveyor 20 is provided with a second set of rotating belts 204, 206 which guide the pieces of lasagna downwardly from the swing conveyor 20 to the travelling conveyor 22. A similar set of downwardly sloping belts are provided at the second end of swing conveyor 20*a* and are also provided at the second end of travelling conveyors 22, 24, 22*a*, 24*a* to transfer the pieces of lasagna onto a respective loading conveyor 210, 212, 214, 216 disposed directly below each travelling conveyor 22, 24, 22*a*, 24*a*.

Figure 2D:
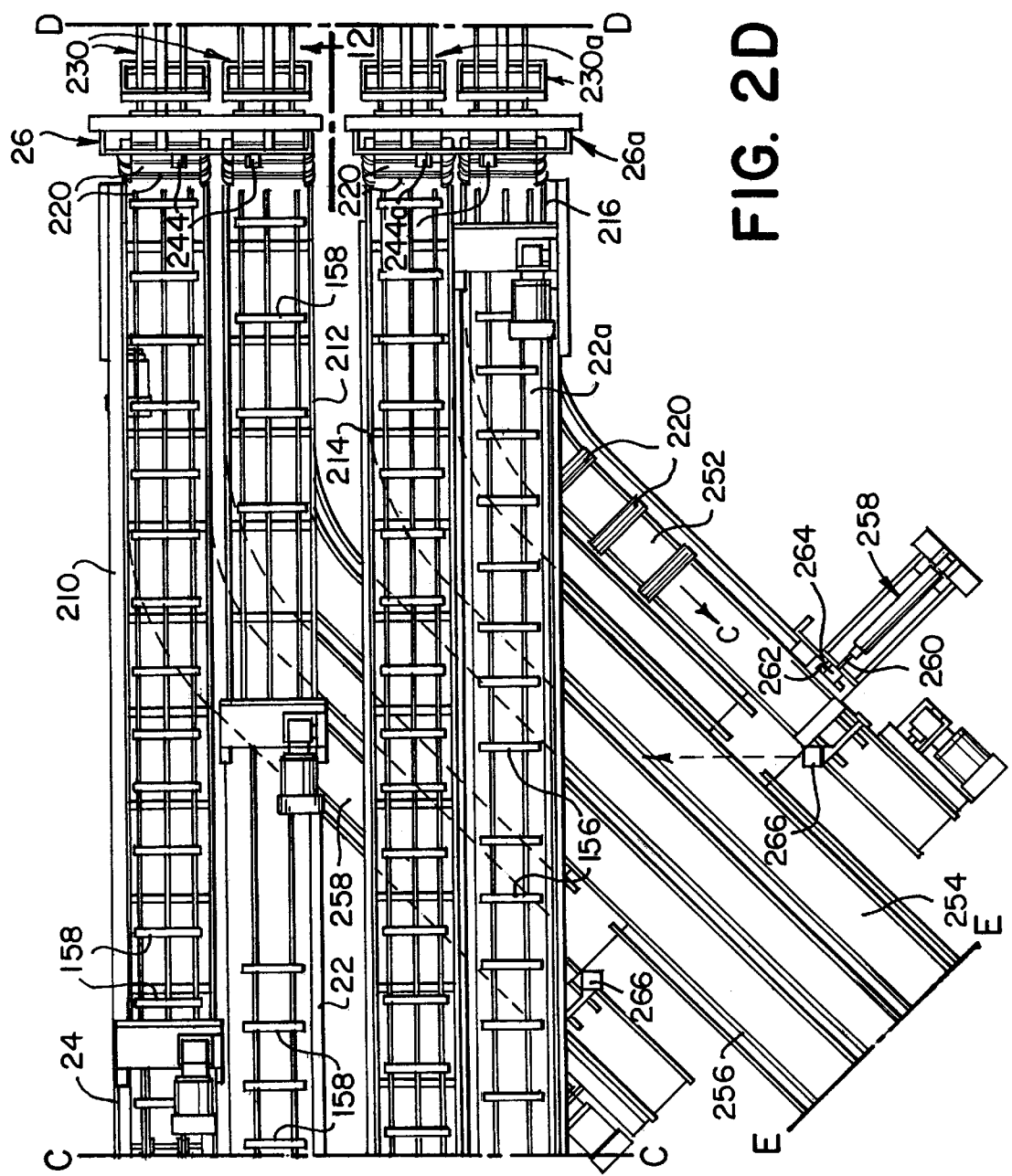

Each of the travelling conveyors 22, 24, 22*a* and 24*a* move in an axial direction (i.e., the direction of travel of the lasagna) between a first limit position and a second limit position. For example, travelling conveyor 22*a* is illustrated in FIGS. 2C and 2D as being in the forward limit position. Travelling conveyor 24*a* is illustrated in FIG. 2C as being in the rearward limit position. Travelling conveyor 22 is illustrated in a position between the rearward limit position and the forward limit position and is travelling towards the forward limit position. Travelling conveyor 24 is illustrated in the position between the forward limit position and the rearward limit position and is travelling toward the rearward limit position. Additionally, each of the travelling conveyors 22, 24, 22a and 24a includes a pair of belts that transmit the pieces of lasagna in the forward direction towards a respective loading conveyor, which loading conveyors 210, 212, 214, 216 then transmit the pieces of lasagna to the bucket indexer 26, 26a.

A fixed loading conveyor 210, 212, 214, 216 is disposed below each travelling conveyor 24, 22, 24a, 22a, respectively. The forward end of each of the travelling conveyors 24, 22, 24a, 22a is provided with a pair of transition belts similar to the forward end of each of the swing conveyors to ensure that each piece of lasagna is smoothly conveyed onto the respective loading conveyor 212 below.

Referring now to FIGS. 12A, 12B and 13, the support mechanism for the swing conveyor 20, travelling conveyor 22 and loading conveyor 212 is illustrated. Loading conveyor 212 has its belts 211 being driven by an electric motor 213, via drive belt 215. Travelling conveyor 22 is disposed above loading conveyor 212 and is supported on a flat rail 217 and an inverted V-shaped rail 219. The front portion of the travelling conveyor 212 includes two wheels one wheel 221 riding on the inverted V-shaped rail 219 and the other wheel (not shown) riding on the flat rail 217.

Additionally, the rear end of travelling conveyor 222 also includes a pair of wheels 223, 225 riding on the rails 219, 217, respectively. A timing belt 227 is fixedly attached to the rear end of the travelling conveyor 22 between the forward limit position and the rearward limit position. Belt 227 is rotatably driven by reversible electric motor 229. Belt 227 oscillates to move the travelling conveyor between the limit positions in a manner similar to how belt 201 oscillates to move the swing conveyor between the first limit position and the second limit position. Electric motor 181 drives the travelling conveyor belts via a drive belt 183. Electric motor 185 drives the swing conveyor belts.

The operation of the swing conveyor 20a, travelling conveyor 24a and loading conveyor 212 will be described below. Referring to FIG. 2C, swing conveyor 20a is illustrated having the first piece of lasagna 156 from the strip 36 of lasagna moving in the forward direction indicated by arrow A in this Figure. A sensor 222a is mounted above swing conveyor 20a to detect when the first piece of lasagna 156 is disposed at a predetermined position below sensor 222. Upon detection of the first piece of lasagna 156, the swing conveyor 20a is actuated to move in the direction indicated by arrow B to a second limit position disposed above travelling conveyor 24a. Travelling conveyor 24a is in the rearward limit position and is stationary awaiting the receipt of the first piece of lasagna 156. It is to be noted that a forward end 224 of travelling conveyor 24a is disposed at a predetermined distance forward of the transition between the swing conveyor 20a and the travelling conveyor 24a. In a preferred embodiment, this predetermined distance is approximately 2 feet. The conveying belts on the swing conveyor 20a are moving forward at a preferred rate of approximately 18" per second. Upon receipt of the first piece of lasagna 156 from the strip 36 of lasagna, the travelling conveyor 24a starts to move forward toward the forward limit position. As travelling conveyor 24a moves forward, the travelling conveyor's belts move slowly forward with respect to the swing conveyor's belts. In a preferred embodiment, the travelling conveyor 24a takes approximately 5 seconds to move from the rearward limit position to the forward limit position. Because the front end of the travelling conveyor 24a is disposed 2 feet in front of the transition between the swing conveyor 20a and the travelling conveyor 24a, it is preferred that the travelling conveyor's belts move forward with respect to the swing conveyor's belts at a rate of 2 feet per 5 seconds (i.e., 4.8 inches per second) greater than the rate of the swing conveyor's belts. Thus, in a preferred embodiment, the travelling conveyor's belts move forward at a rate of 4.8 inches per second relative to the travelling conveyor and the swing conveyor's belts are moving forward at a rate of 18 inches per second. However, the travelling conveyor is moving forward at a rate of 18" per second. Thus, the travelling conveyor's belts are moving forward at a rate of 22.8 inches per second relative to the ground. Thus, the spacing between each piece of lasagna on the travelling conveyor 24a is greater than the spacing between each piece of lasagna on the swing conveyor 20a.

When the travelling conveyor 22 reaches its forward limit position, such as travelling conveyor 22a illustrated in FIG. 2D, the first piece of lasagna 156 is just about to be transmitted onto the loading conveyor 212 below. The travelling conveyor 22 is now at its forward limit position and starts to move backward at a preferred rate of 18" per second. The speed of the travelling conveyor's belts is now increased from 4.8" per second to the rate of 18" per second. In other words, the travelling rate of the travelling conveyor belts is increased by 13.2" per second compared to when the travelling conveyor is moving forward. Because the travelling conveyor 22 itself is moving backward at 18 inches per second and the belts are moving forward at 18 inches per second, each piece of lasagna does not appear to be moving with respect to the fixed frame when the travelling conveyor 22 is moving backwards. Each piece of lasagna simply appears to be falling onto the loading conveyor 212 below. Each of the loading conveyor's belts are preferably moving forward at the rate of 28 inches per second. Thus, the spacing between each adjacent piece of lasagna is even greater on the loading conveyor 212 than it is on the travelling conveyor 24a, which can clearly be seen in FIG. 21D where the spacing between each adjacent piece of lasagna on loading conveyor 212 is greater than the spacing between each adjacent piece of lasagna on travelling conveyor 22.

The travelling conveyor 22 continues to move backwards while its belts move forward, thus transmitting the lasagna from the travelling conveyor 22 onto the loading conveyor 212 below. When the travelling conveyor 22 reaches its rearward limit position, all of the pieces of lasagna have been transferred onto the loading conveyor 212 below and the travelling conveyor 22 awaits in this position until the first piece of lasagna from a new strip is deposited thereon. The cycle is then ready to be repeated.

The swing conveyors, travelling conveyors and loading conveyors significantly slow down the rate of the lasagna as it approaches the bucket indexers 26, 26a by dividing the swing conveyor path into two travelling conveyors and simultaneously increases the spacing between each adjacent piece of lasagna. For example, in a preferred embodiment each adjacent piece of lasagna is spaced apart by approximately 6 inches on the loading conveyor, 1 inch on the traveling conveyor and ½ inch on the swing conveyor. It is to be noted that the travelling conveyors 22, 22a travel forward to load each travelling conveyor 22, 22a with a strip of lasagna and then travel backwards to transfer the strip of lasagna from the travelling conveyor 22, 22a onto the loading conveyor 212 below. Once the lasagna is on the loading conveyor 212, the lasagna is then transmitted forward to the bucket indexer station 26, 26a.

Figure 15:
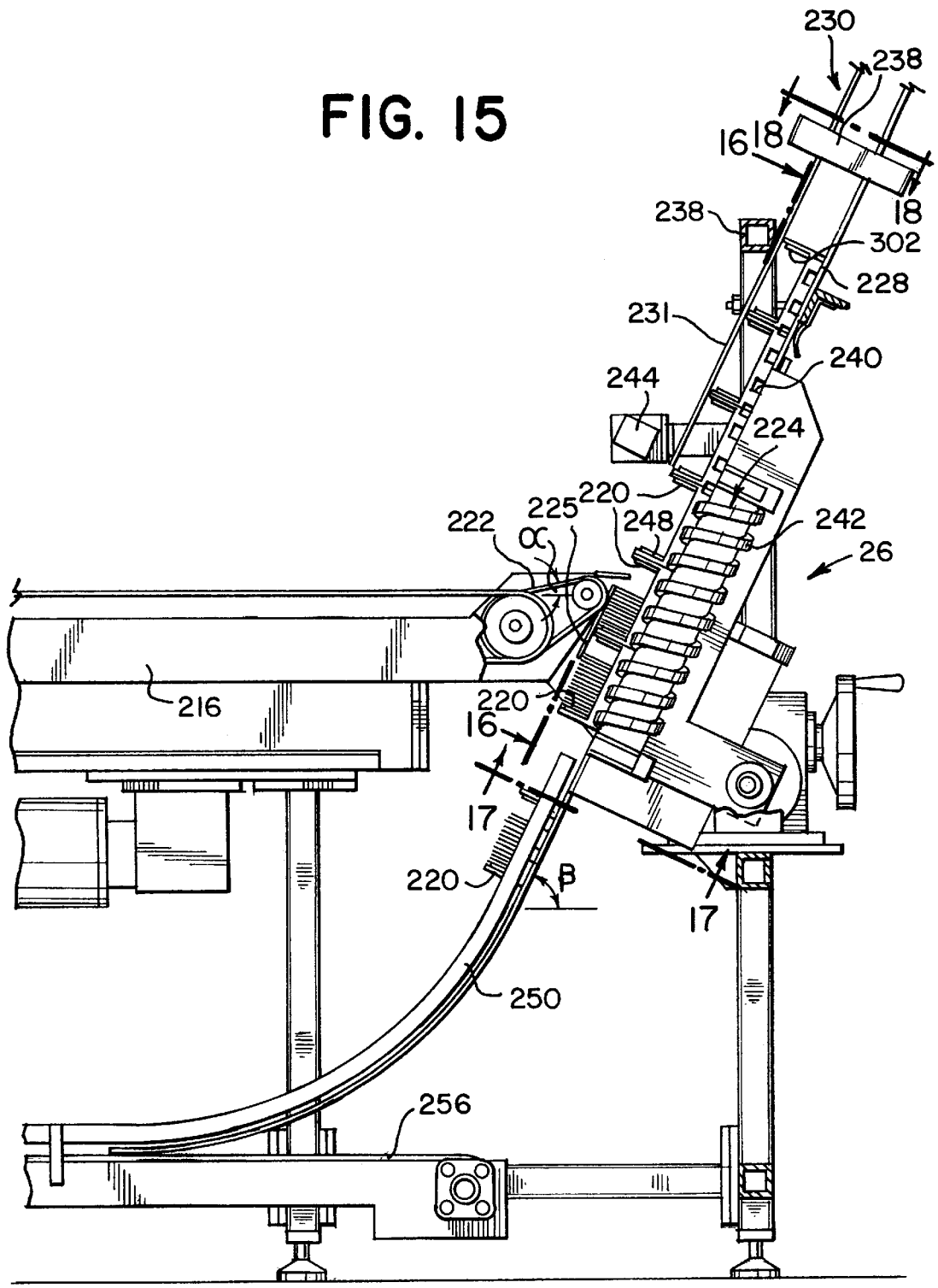
FIG. 15 is a side view of the bucket indexer according to the present invention.

Referring now to FIGS. 2D and 15–20, the bucket indexer 26, 26a is illustrated. Referring now to FIG. 2D, lasagna is transferred from the forward end of each loading conveyor 210, 212, 214, 216 into a bucket 220 disposed in the bucket indexer. As illustrated in FIG. 15, the forward end of each loading conveyor has a pair of endless belts 222, which are disposed between the forward end of each travelling conveyor 22, 22a and the entrance to each bucket 220. The upper supporting surface of belts 222 is disposed at an angle α with respect to a horizontal reference plane (which is parallel with respect to the upper surface of the belts of the loading conveyors). In a preferred embodiment this angle α and is approximately 17°. Belt 222 travels forward at approximately the same speed as the belts of the loading conveyor 212. Thus, each piece of lasagna that is transmitted from the loading conveyor 212 first travels up the intermediate belts 222 and then is gently thrown into the waiting bucket 220. Because of the incline of belts 222, the lasagna is gently tossed into the air and appears to float into the bucket and land gently on surface 248 of an empty bucket 220 or on top of an immediately preceding piece of lasagna as is illustrated in FIG. 15. Applicants have discovered that without the use of inclined belts 222, the lasagna did not transfer properly into buckets 220. Without belts 222, the leading edge of each transferred piece of lasagna tended to angle downwardly and was not properly received in bucket 220. For example, the pieces flipped over, failed to clear the path for the next piece, and momentarily stood on edge in a vertical position. For a half pound carton of lasagna, approximately 9 or 10 pieces of lasagna are placed within each bucket 220. Similarly for a one pound carton of lasagna, anywhere between 18 and 21 pieces of lasagna are placed within each bucket 220. The illustrated buckets 220 are sized to accommodate one pound of dry lasagna noodles and receive between 18 and 21 pieces of lasagna when filled. If one-half pound cartons of lasagna are desired, smaller buckets are preferred to be used. The smaller buckets are of the same length as the larger ones to accommodate 10" long pieces of lasagna, but are of a smaller width and only have two helical notches 240 to mate with two threads 242 of the helical screw feed mechanism 224.

Figure 16:
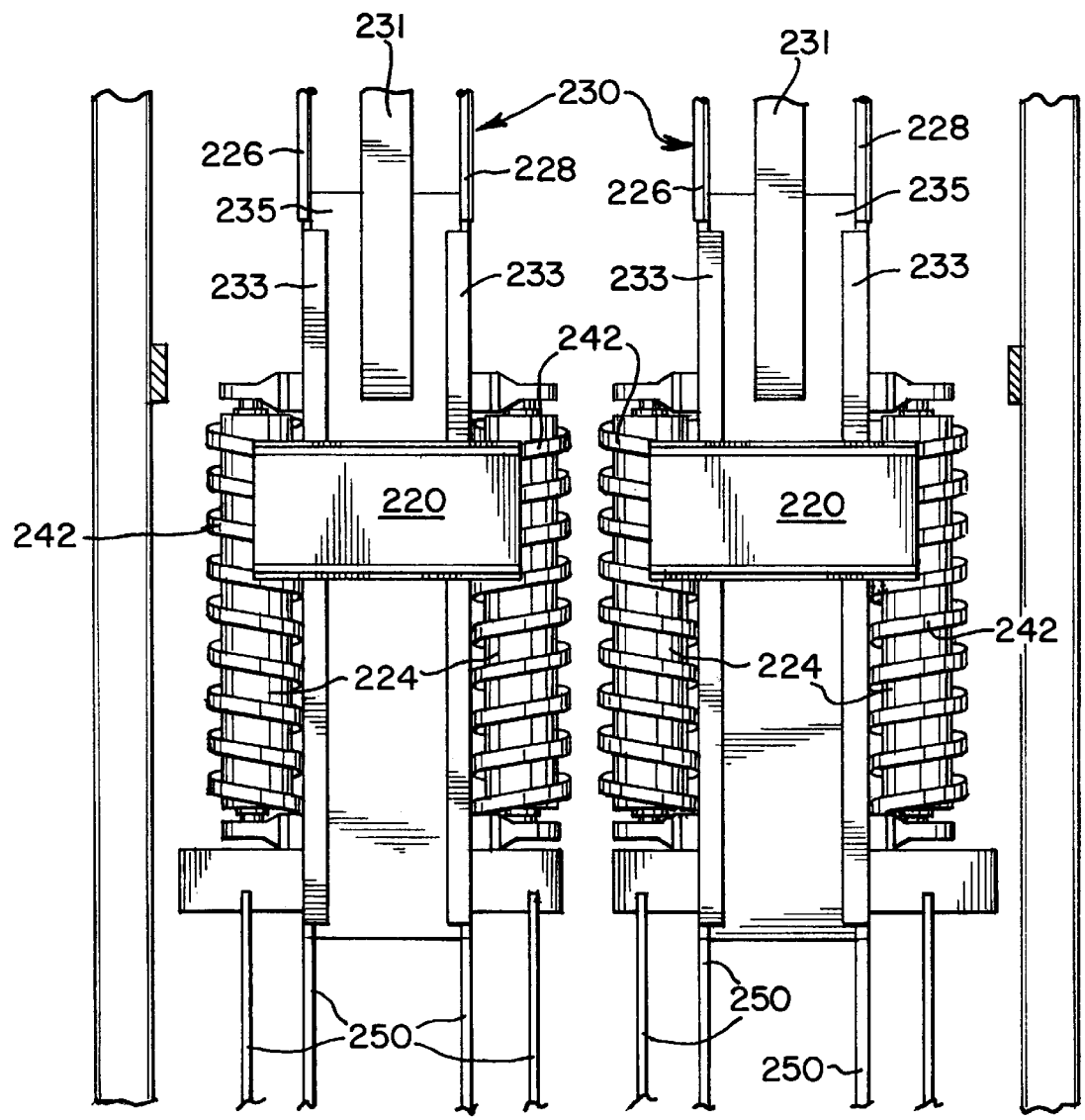
FIG. 16 is a sectional view taken along lines 16—16 of FIG. 15 and looking in the direction of the arrows.
Figure 17:
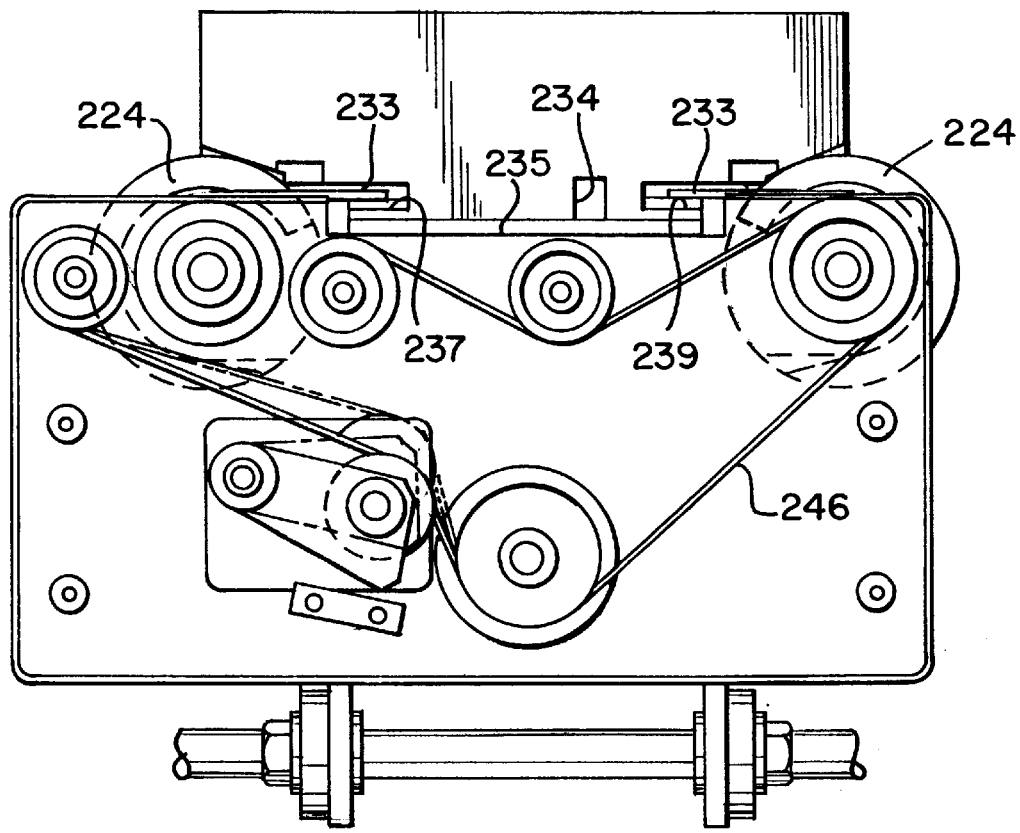
FIG. 17 is a sectional view taken along lines 17—17 of FIG. 15 and looking in the direction of the arrows.
Figure 18:
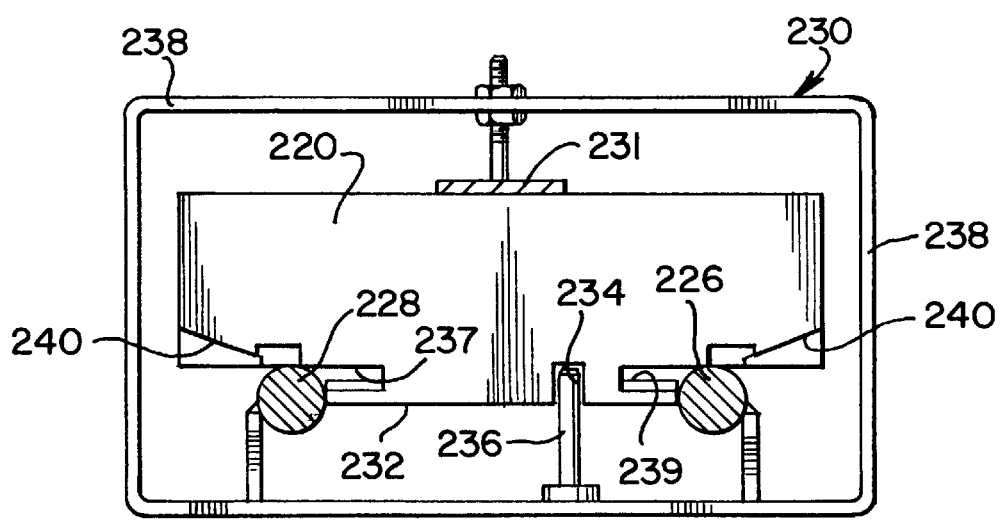
FIG. 18 is a sectional view taken along lines 18—18 of FIG. 15 and looking in the direction of the arrows.
Figure 19:
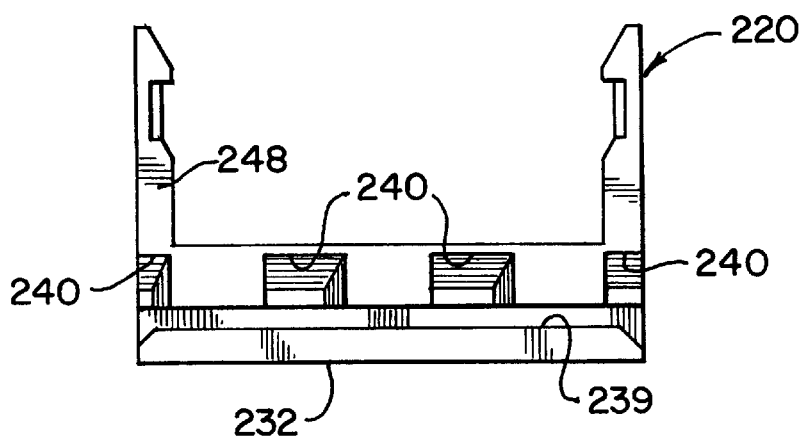
FIG. 19 is an end view of a bucket according to the present invention.
Figure 20:
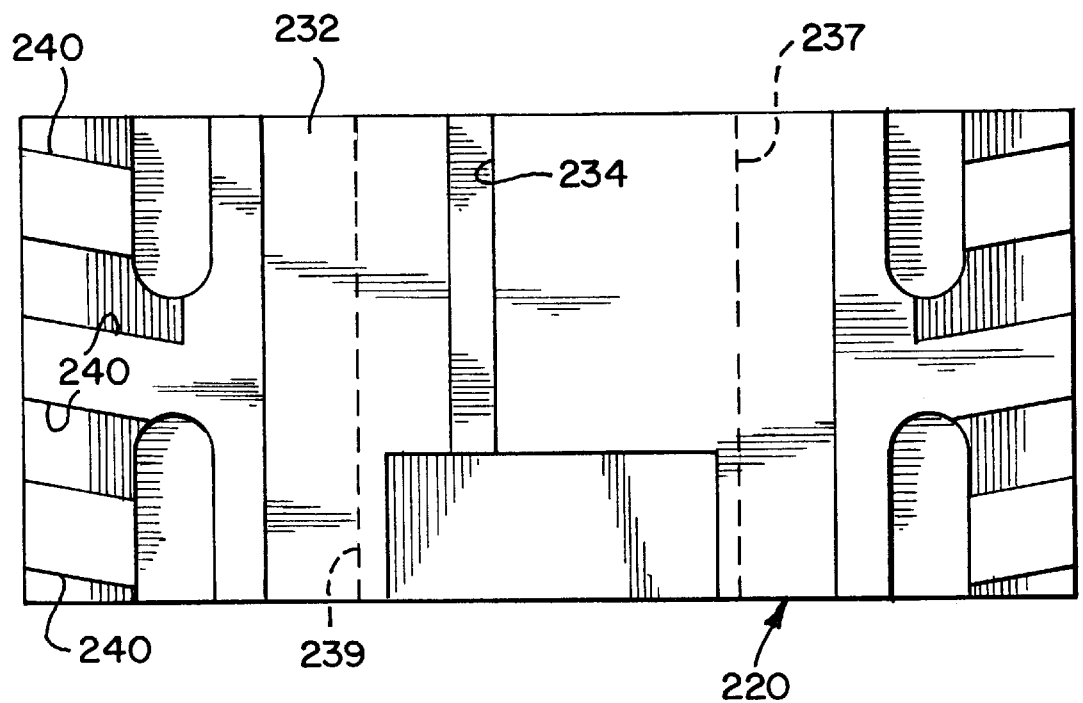
FIG. 20 is a bottom view of a bucket according to the present invention.

Each bucket indexer 26, 26a is comprised of two downwardly moving paths of buckets 220. Each bucket 220 is transmitted downwardly into the bucket indexer 26, 26a. As illustrated in FIG. 18, the buckets are fed into the indexer from overhead delivery conveyors by chutes 230. Each chute is connected such that the backs are maintained in position at their rear surface by two guide rods 226, 228 and at their front surface by a guide plate 231. Plate 231 ensures that the buckets do not fall forward out of the chute 230. As illustrated in FIG. 16, once the bucket 220 exits the chute 230, and is no longer supported by rods 226, 228, the buckets are engaged and supported by rear surface supporting guide plate 235. The buckets 220 are further guided by fixed guide plates 233 (see FIGS. 16 and 17). Plates 233 are received in a pair of U-shaped slots 237, 239 within the buckets 220, which slots are adjacent to the rear surface of the buckets.

The rear surface 232 of each bucket includes a U-shaped slot 234 which extends from the front side to the back side. A pin 236 is fixedly mounted to bracket 238. U-shaped slot 234 is disposed off center within bucket 220 to ensure that the bucket 220 has been placed in the proper position before being received in the bucket indexer 26, 26a. In other words, if the bucket 220 was misplaced in the bucket indexer (i.e., in a backward orientation such that the front side was disposed on the trailing side and vice versa), pin 236 would engage bucket 220 and not permit bucket 220 to enter the screw feed mechanism. The side of each bucket 220 includes a plurality of helical notches 240 which are shaped to mate with the helical threads 242 of helical screw 224. Thus, if the bucket 220 were received in the upside down condition, the threads 242 would not mate with the helical notches 240 causing, a condition which will cause a stoppage of the assembly line and may cause damage to the bucket 220 or the helical threads 242, or both.

The bucket indexer 26 is mounted at an angle β (see FIG. 15), which in a preferred embodiment is approximately 78° so that the pieces of lasagna will be easily received from the endless belts 222 and thereafter will be maintained within each bucket 220. A guide plate 225 is attached to the forward end of the loading conveyors 210, 212, 214, 216 to ensure that the lasagna does not fall out of the loaded buckets (see FIG. 2E). A sensor 244 is fixedly mounted to frame 238. Sensor 244 detects and causes the control system to count the number of pieces of lasagna that are fed into each bucket 220. As illustrated in FIG. 17, each helical screw 224 is fed by common belt drive 246. As the sensor 244 detects and sends a signal to the control system, which counts the number of pieces of lasagna being fed into each bucket 220, the control system then rotates screws 224 by a predetermined amount so that the bucket 220 is lowered by approximately the thickness of each piece of lasagna. Thus, the bucket 220 is in the proper position to receive the next piece of lasagna. This process continues until the bucket 220 is filled with a predetermined number of pieces of lasagna. For example, perhaps nineteen pieces of lasagna have been fed into the one pound bucket. The control system then causes screws 224 to rotate by a much greater amount so that the inside side surface 248 of the next empty bucket is properly positioned to receive the next piece of lasagna. The bucket 220 is then incrementally moved down after each piece of lasagna is received in the bucket 220 until this bucket has been filled, and the process continues to place the next empty bucket to receive the next piece of lasagna.

The filled buckets continue to move downward to the bucket indexer 26, 26a and are finally released onto track 250. The bottom of track 250 is illustrated in FIGS. 12B and 15. Similar tracks are placed below the bucket indexer 26, 26a for each of the other loading conveyors 210, 212, 214. These tracks feed conveyor belts 252, 254, 256 and 258. The filled buckets 220, which are traveling on the outermost conveyor belts 252, 258, are combined with the filled buckets travelling on the inside conveyor belts 254, 256, respectively. Conveyor belts 252, 254 are combined with a push bar mechanism 258 that includes a reciprocating push rod 260 and pusher plate 262 attached to the forward end of reciprocating rod 260. A first sensor 264 is mounted adjacent to and above mechanism 258. A second sensor 266 is disposed adjacent to conveyor belt 252 and detects if there is an open space available on conveyor belt 254 to receive the filled bucket on belt 252. Accordingly, upon the detection of a loaded bucket 220 at the end of belt 252 by sensor 264, the control system determines if an open space is available based on the signal received from sensor 266. When sensor 266 detects that there is an open space available on conveyor belt 254, mechanism 258 is actuated so that piston rod 260 is moved to a forward position thereby causing the filled bucket 220 to move from conveyor belt 252 to conveyor belt 254. Filled buckets from outer conveyor belt 258 are transferred to conveyor belt 256 in a similar manner.

Figure 2E:
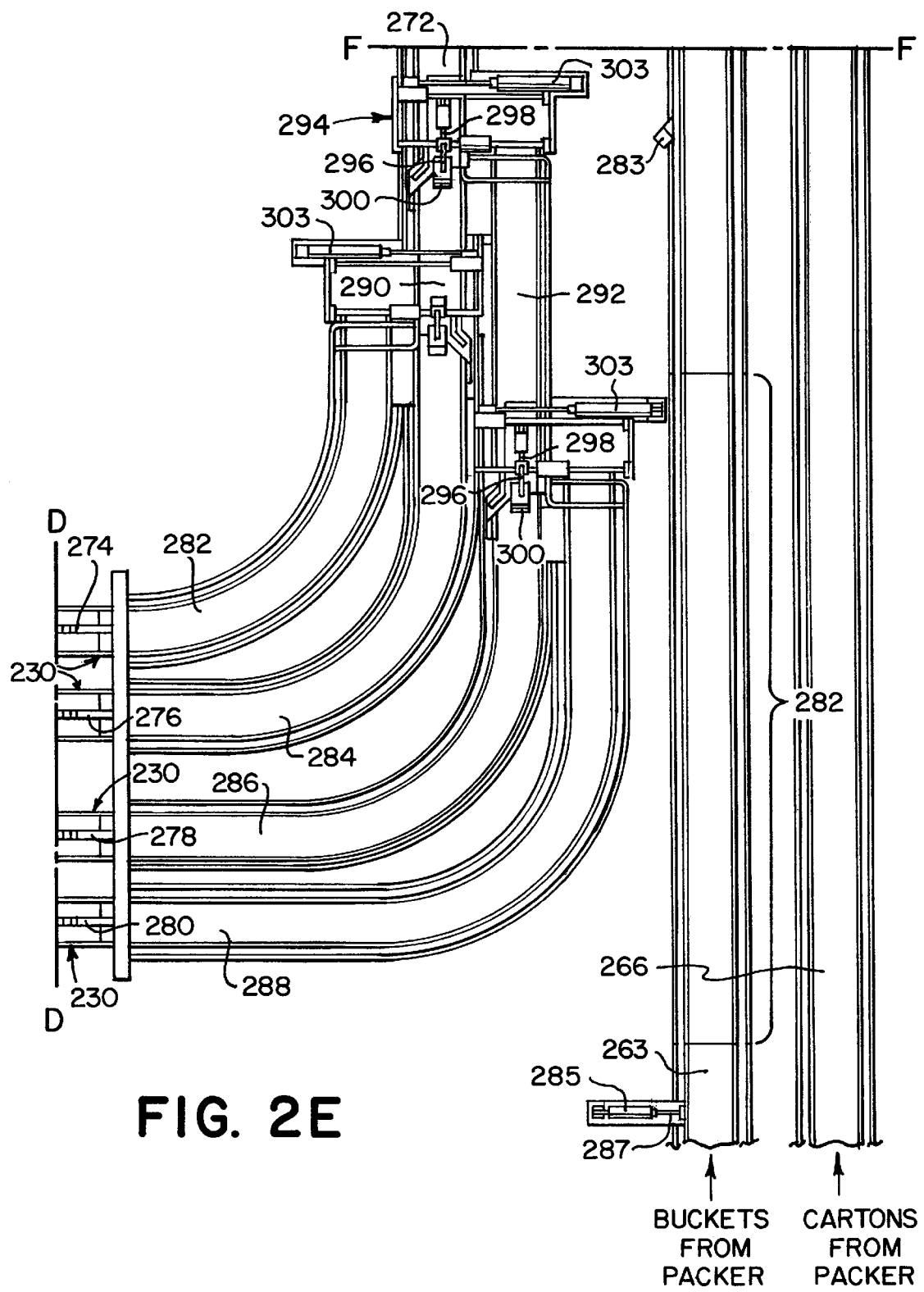
Figure 2F:
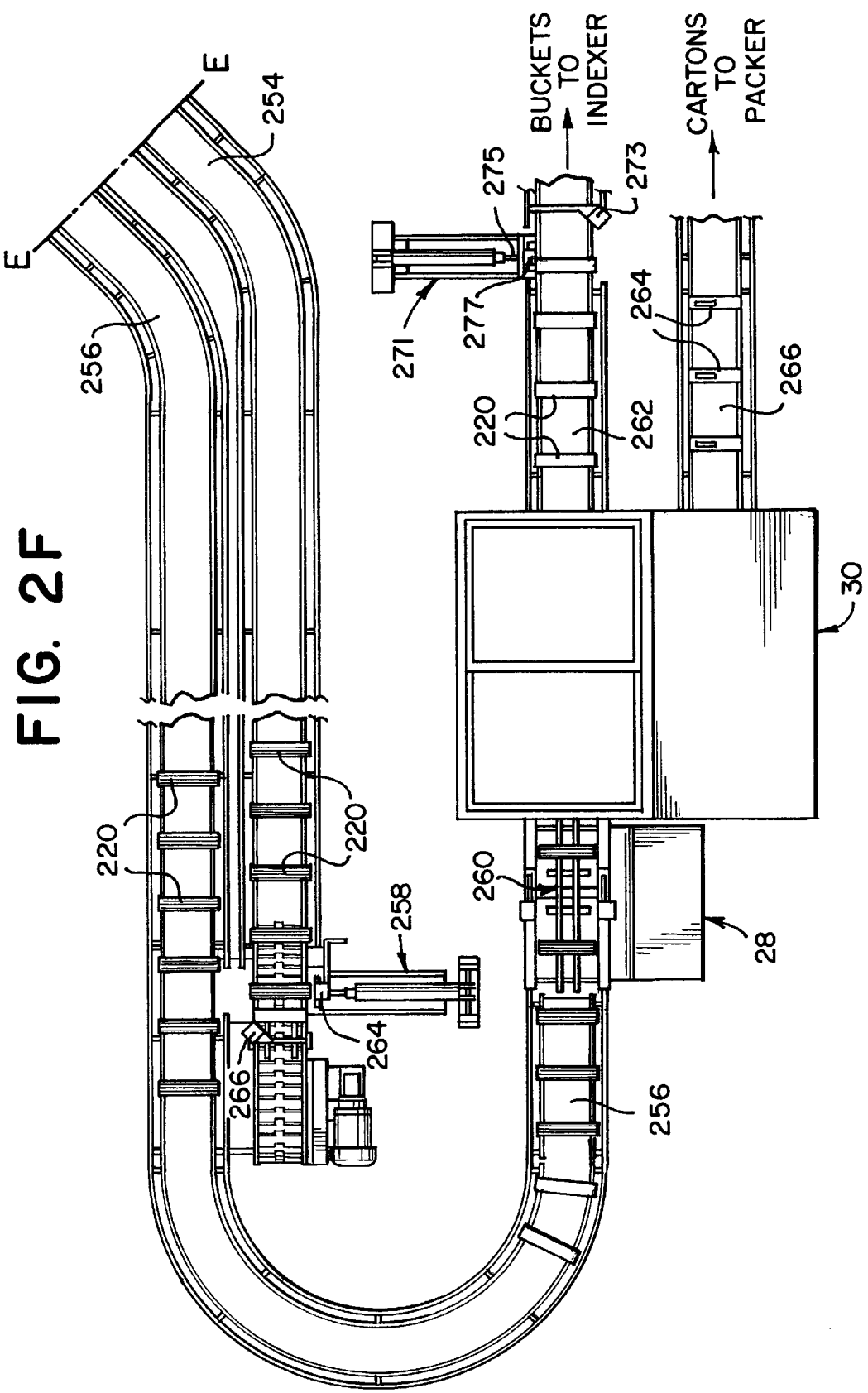

As illustrated in FIG. 2F, the filled buckets 220 travelling on conveyor belts 254 are combined with the filled buckets travelling on conveyor belt 256 by another bucket combining mechanism 258. The buckets then pass over a check weigher 28 which determines the weight of each individual filled bucket 220. The check weigher 28 includes a conventional scale mechanism 260. Each bucket 220 must be of a certain predetermined minimum weight so that the packed carton of lasagna will contain the minimum required amount of weight of lasagna. Simultaneously, the check weigher ensures that each filled bucket 220 is not overpacked with lasagna. A signal representing the weight of each filled bucket of lasagna 220, is conveyed to the control system which adjusts the positions of cutting mechanisms 124, 124a to make the pieces of lasagna either larger or smaller as is required. The filled buckets 220 are then transmitted into a cartoner 30. However, before passing into a cartoner 30, another fixed pin is positioned at the entry of cartoner 30, similar to pin 236, to ensure that each bucket 220 is properly oriented before entering the cartoner 30. The cartoner 30 itself is of conventional structure. For example, a Horizontal Cartoner™ can be purchased from the Superior Cartoning Machining Company of Carlstadt, N.J. The empty buckets 220 are then discharged from cartoner 30 onto conveying belt 263.

In addition, the packed cartons 264 of lasagna, preferably of either a half pound size or one pound size, are then discharged onto conveyor belt 266. The empty buckets 220 are returned to the bucket indexer 26, 26a along the conveyor belt path 263 which is illustrated in FIG. 2F to the conveyor belt 263 illustrated in FIG. 2E. Similarly, the filled cartons are transmitted along conveyor belt path 266. Referring now to FIG. 2G, the filled cartons are then transferred along conveyor belt 266 to a conventional case packer 268. As illustrated in FIG. 2F, a bucket ejection mechanism 271 is illustrated. A sensor 273 is disposed above belt 263 to detect if any lasagna remains within bucket 220. If sensor 273 detects the presence of lasagna, ejection station 271 is actuated causing piston rod 275 to move forwardly over belt 263. A pusher plate 277 fixedly connected to the forward end of rod 275 then engages the bucket 220 containing the lasagna and removes that bucket from belt 263.

Referring now to FIGS. 2E and 2G, the empty buckets 220 are then transmitted along conveyor belt 263 about a U-shaped bend 270 and continue along on conveyor belt 272, in the direction indicated by arrow D in FIG. 2G. A sensor 274 is placed alongside the path of the downstream side of the U-shaped bend 270 to detect if the empty buckets 220 are backed up to a point just downstream of the U-shaped bend. If a back up of buckets is detected by sensor 274, then a stop mechanism 281, which is disposed on the upstream side of the U-shaped bend, is actuated causing a rod 283 to extend into conveyor belt path 263 to prevent further empty buckets from entering into the U-shaped bend 270. Rod 283 is illustrated in FIG. 2G in the fully retracted position. It is preferable to prevent the empty buckets 220 from accumulating in the U-shaped bend because a back up of buckets in the U-shaped bend may cause a misalignment of the buckets 220 as they bunch up.

A bucket alignment mechanism 276 is also illustrated in FIG. 2G. It is preferred to align the empty buckets 220 in a square alignment before entering the U-shaped bend to prevent misalignment of the buckets 220 about the U-shaped bend. A sensor 280 detects when a bucket 220 is approaching and causes piston rod to actuate at the appropriate time thereby forcing the empty bucket into alignment. Alternatively, once could use a friction wheel to align the buckets.

Referring now to FIG. 2, a second sensor 283 is disposed at the top of an uphill portion 282 of conveying belt path 263. If sensor 283 detects that a back up of empty buckets 220 exists at the top of the hill, then the control system will actuate a second stop mechanism 285 disposed at the bottom of the hill, which operates similar to stop mechanism 281, to prevent empty buckets 220 from passing beyond second stop 285. It is preferable to prevent the empty buckets 220 from accumulating in the uphill portion, because a back up of empty buckets on the uphill portion of the conveyor belt will cause a jamming of the empty buckets 220 because the buckets are not permitted to slide relative to the conveying belt in the uphill portion.

Referring now to FIG. 2E, conveyor belt path 272 is illustrated as branching out into four paths to feed each of the four paths in the bucket indexer 26, 26a. A sensor 274, 276, 278, 280 is disposed above each of conveying paths 282, 284, 286, 288, respectively. Each sensor 274, 276, 278, 280 determines whether there is predetermined supply of empty buckets 220 awaiting to be threaded by screw element 224 in the respective bucket indexer. The empty buckets 220 are conveyed from path 272 and are normally equally divided into paths 290 and 292. Likewise, the empty buckets 220 on path 290 are equally divided between conveyor belt paths 282 and 284, and the empty buckets on conveyor belt path 292 are equally divided between conveyor belt paths 286 and 288. However, if the sensors 274, 276, 278, 280 detect that one or more of the paths has an insufficient amount of empty buckets, and that the other paths have a sufficient amount, then the control system forwards the empty buckets to the path in which they are needed.

The empty buckets travelling along conveyor belt 272 are divided into conveyor belts 290, 292 by a transfer mechanism 294. Transfer mechanism 294 includes an L-shaped bracket 296 which is actuated forward and downwardly by actuation of a piston rod 298. The distal leg 300 of L-shaped bracket 296 engages within the inside upper surface 302 of the empty bucket 220 to stop the empty bucket 220 from being further transmitted along conveyor belt 222. A pusher mechanism 303, including an actuating piston rod, is actuated while the L-shaped bracket 296 is engaged in the bucket and moves the empty bucket 220 along with the L-shaped bracket 296 to conveyor belt 292. The L-shaped bracket 296 then releases the bucket 220 for forward movement on belt 292. The L-shaped bracket 296 is then returned to its original position by return of pusher mechanism 303 to its original position. The next empty bucket 222 is again captured by the L-shaped bracket 296 and this time the push mechanism 303 is not actuated and thus permits the released empty bucket 222 to travel straight along onto conveyor belt path 290. A similar bucket transfer mechanism is disposed at the junction between conveyor belt path 290 and conveyor belt paths 282, 284 and the junction between conveyor belt path 292 and belts 286 and 288. Thus, an even supply of empty buckets 220 is maintained at each end of the conveyor belt paths 282, 284, 286 and 288.

Having described the presently preferred exemplary embodiment of a packaging system for dry lasagna product in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

We claim:

1. An automatic packaging system for dry lasagna noodle product comprising:

a vacuum drum having means for automatically lifting a top layer of a lasagna noodle from a bottom layer, which layers are travelling on a conveyor belt, and replacing the top layer back onto the conveyor belt behind the bottom layer;

a water knife cutter disposed downstream from said vacuum drum, said water knife cutting the lasagna in half;

an inspection/rejection station disposed downstream from said water knife cutter, said inspection/rejection station having means for inspecting each piece of lasagna to ensure that it is of uniform shape and satisfies a predetermined minimum quality standard;

a swing conveyor disposed downstream from said inspection/rejection station, said swing conveyor transmitting lasagna onto one of two travelling conveyors, said travelling conveyors transmitting the lasagna onto a loading conveyor, said loading conveyors transmitting the lasagna into a bucket in a bucket indexer station.

2. An automatic packaging system for dry lasagna noodle product comprising:

a rotatable drum having an interior chamber, a vacuum being applied to said interior chamber so that a top layer of a lasagna noodle is liftable from a bottom layer, which layers are travelling on a conveyor belt, an outer periphery of said drum being perforated with a plurality of throughholes;

a platform having a top surface being disposed below said conveyor belt, a plurality of perforations being disposed in said top surface, a vacuum being applied through said perforations in said top surface for transmitting a vacuum holding force to the bottom layer of lasagna noodle.

3. The system according to claim 2, wherein said vacuum applied to said interior chamber is selectively variable so that an essentially constant vacuum level is maintained in said interior chamber.

4. The system according to claim 2, further comprising an arcuately shaped shoe being disposed in said interior chamber of said drum.

5. The system according to claim 4, wherein said shoe is movable between a vacuum blocking position and a vacuum permitting position.

6. The system according to claim 5, wherein in said vacuum blocking position, said shoe is disposed adjacent to said outer periphery of said drum.

7. The system according to claim 6, wherein in said vacuum permitting position, said shoe is disposed spaced from said outer periphery of said drum.

8. The system according to claim 2, further comprising a swing conveyor disposed downstream from said vacuum drum, said swing conveyor transmitting lasagna onto one of two travelling conveyors.

9. The system according to claim 8, wherein said travelling conveyors transmit the lasagna onto a loading conveyor.

10. The system according to claim 9, wherein said loading conveyors transmit the lasagna into a bucket in a bucket indexer station.

11. The system according to claim 10, further comprising a water knife cutter disposed downstream from said vacuum drum, said water knife cutting the lasagna essentially in half.

12. The system according to claim 11, further comprising an inspection/rejection station disposed downstream from said water knife cutter, said inspection/rejection station having means for inspecting each piece of lasagna to ensure that it is of uniform shape and satisfies a predetermined minimum quality standard.

13. An automatic packaging system for dry lasagna noodle product comprising:

a pivoting swing conveyor for transmitting lasagna, which is traveling in a single layer on a conveyor belt, onto one of two travelling conveyors, said swing conveyor being disposed above said two travelling conveyors, said swing conveyor has a first end and a second end, said swing conveyor pivots about said first end between a first position so that said second end is disposed over a first one of said two travelling conveyors and a second position so that said second end is disposed over a second one of said two travelling conveyors.

14. The system according to claim 13, wherein said second end of said swing conveyor is disposed in a fixed guide housing to guide said movement of said second end between said first position and said second position.

15. The system according to claim 13, wherein each of said travelling conveyors are movable in an axial direction between a forward position and a rearward position.

16. The system according to claim 13, further comprising a fixed loading conveyor being disposed below each travelling conveyor.

17. The system according to claim 16, further comprising a pair of endless belts being disposed at a forward end, remote from said travelling conveyor, of each of said loading conveyors.

18. The system according to claim 17, wherein said endless belts have an upper supporting surface disposed at an acute angle with respect to a horizontal reference plane.

19. The system according to claim 18, wherein said acute angle is approximately 17°.

20. The system according to claim 13, wherein said loading conveyors transmit the lasagna into a bucket in a bucket indexer station.

21. The system according to claim 20, further comprising a vacuum drum disposed upstream of said swing conveyor, said vacuum drum having means for automatically lifting a top layer of a lasagna noodle from a bottom layer, which layers are travelling on a conveyor belt, and replacing the top layer back onto the conveyor belt behind the bottom layer thereby forming the single layer of lasagna.

22. The system according to claim 21, further comprising a water knife cutter disposed downstream from said vacuum drum, said water knife cutting the lasagna essentially in half.

23. The system according to claim 22, further comprising an inspection/rejection station disposed downstream from said water knife cutter, said inspection/rejection station having means for inspecting each piece of lasagna to ensure that it is of uniform shape and satisfies a predetermined minimum quality standard.

* * * * *